United States Patent
Cheng et al.

(10) Patent No.: US 10,383,018 B2
(45) Date of Patent: *Aug. 13, 2019

(54) WIFI AND CELLULAR COMMUNICATION SWITCHING

(71) Applicants: Wesley Cheng, Redwood City, CA (US); Martin Gronberg, Redwood City, CA (US)

(72) Inventors: Wesley Cheng, Redwood City, CA (US); Martin Gronberg, Redwood City, CA (US)

(73) Assignee: Bao Tran, Saratoga, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/331,866

(22) Filed: Oct. 23, 2016

(65) Prior Publication Data

US 2017/0048774 A1  Feb. 16, 2017

Related U.S. Application Data

(63) Continuation of application No. 10/677,098, filed on Sep. 30, 2003, now Pat. No. 7,702,739, and a continuation of application No. 12/749,412, filed on Mar. 29, 2010, now abandoned, and a continuation of
(Continued)

(51) Int. Cl.
| | |
|---|---|
| *H04W 36/16* | (2009.01) |
| *H04L 12/801* | (2013.01) |
| *H04L 12/813* | (2013.01) |
| *H04L 12/893* | (2013.01) |
| *H04L 29/08* | (2006.01) |
| *H04L 29/06* | (2006.01) |
| *H04W 48/18* | (2009.01) |
| *H04M 15/00* | (2006.01) |
| *H04W 4/24* | (2018.01) |
| *H04L 1/00* | (2006.01) |
| *H04L 12/24* | (2006.01) |

(Continued)

(52) U.S. Cl.
CPC ............ *H04W 36/16* (2013.01); *H04L 47/10* (2013.01); *H04L 47/14* (2013.01); *H04L 47/20* (2013.01); *H04L 47/40* (2013.01); *H04L 67/327* (2013.01); *H04L 69/14* (2013.01); *H04M 15/60* (2013.01); *H04W 4/24* (2013.01); *H04W 48/18* (2013.01); *H04L 1/0057* (2013.01); *H04L 41/0816* (2013.01); *H04W 84/042* (2013.01); *H04W 84/12* (2013.01)

(58) Field of Classification Search
CPC ..... H04W 88/06; H04W 64/00; G01S 5/0036; G01S 5/10
See application file for complete search history.

(56) References Cited

U.S. PATENT DOCUMENTS

| | | | | |
|---|---|---|---|---|
| 7,603,139 | B1 * | 10/2009 | Tom ................... | H04M 1/0254 455/550.1 |
| 2004/0215665 | A1 * | 10/2004 | Edgar .................... | H04L 63/08 |

(Continued)

*Primary Examiner* — Barbara B Anyan
(74) *Attorney, Agent, or Firm* — Tran & Associates

(57) ABSTRACT

A system includes a server; a plurality of wireless networks coupled to the server; and one or more mobile devices coupled to the wireless networks with intermittent access to the wireless networks, the plurality of wireless networks providing data communication between client and server applications over multiple available connections.

20 Claims, 27 Drawing Sheets

Related U.S. Application Data application No. 14/034,509, filed on Sep. 23, 2013, now Pat. No. 9,510,277.

(60) Provisional application No. 60/415,546, filed on Oct. 1, 2002.

(51) Int. Cl.
*H04W 84/04* (2009.01)
*H04W 84/12* (2009.01)

(56) References Cited

U.S. PATENT DOCUMENTS

| | | | |
|---|---|---|---|
| 2005/0037775 A1* | 2/2005 | Moeglein | G01S 5/0036 455/456.1 |
| 2008/0089347 A1* | 4/2008 | Phillipi | H04L 41/083 370/400 |
| 2010/0223359 A1* | 9/2010 | Runstedler | H04W 4/08 709/219 |
| 2016/0255181 A1* | 9/2016 | Shaltiel | H04M 1/006 455/417 |

* cited by examiner

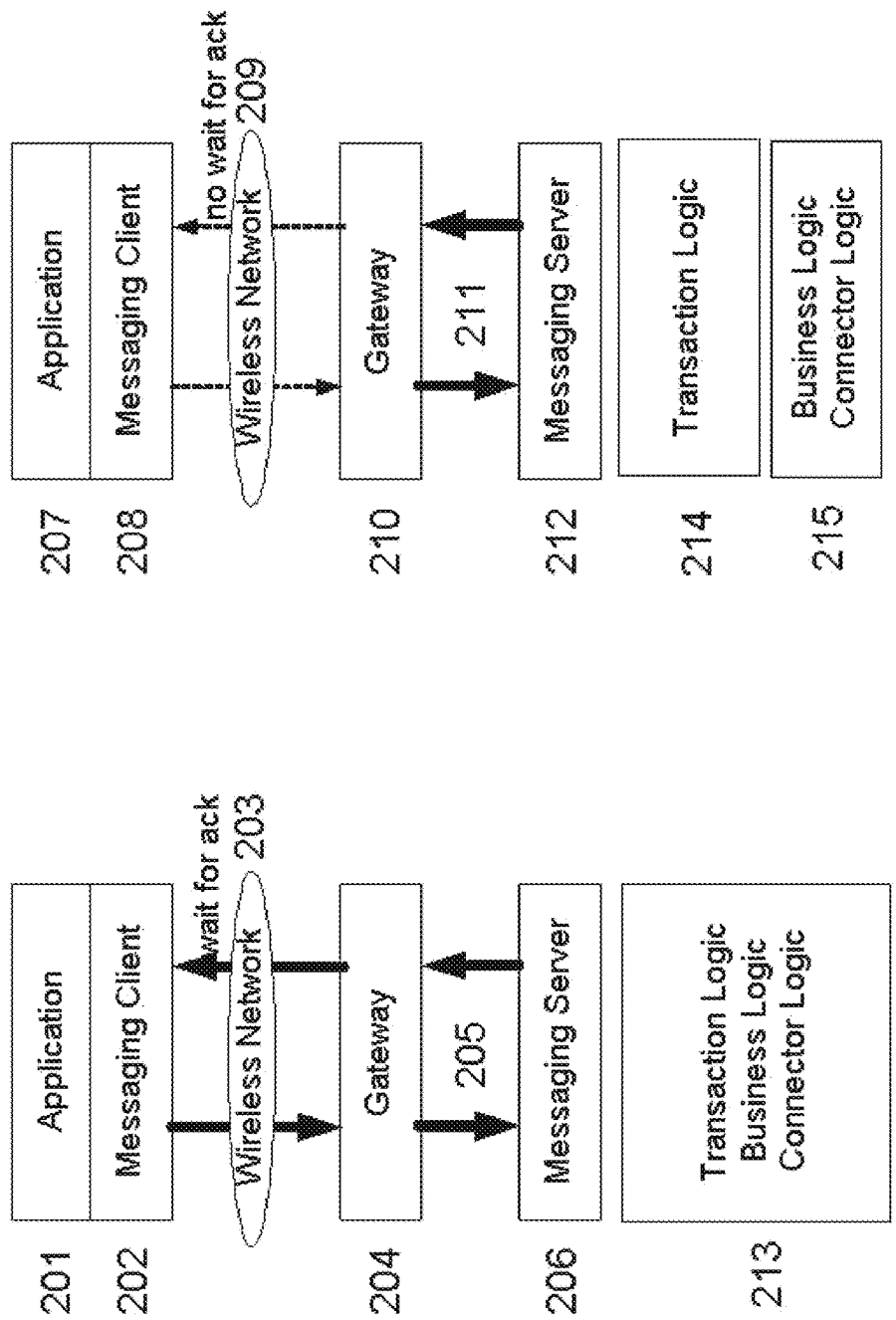

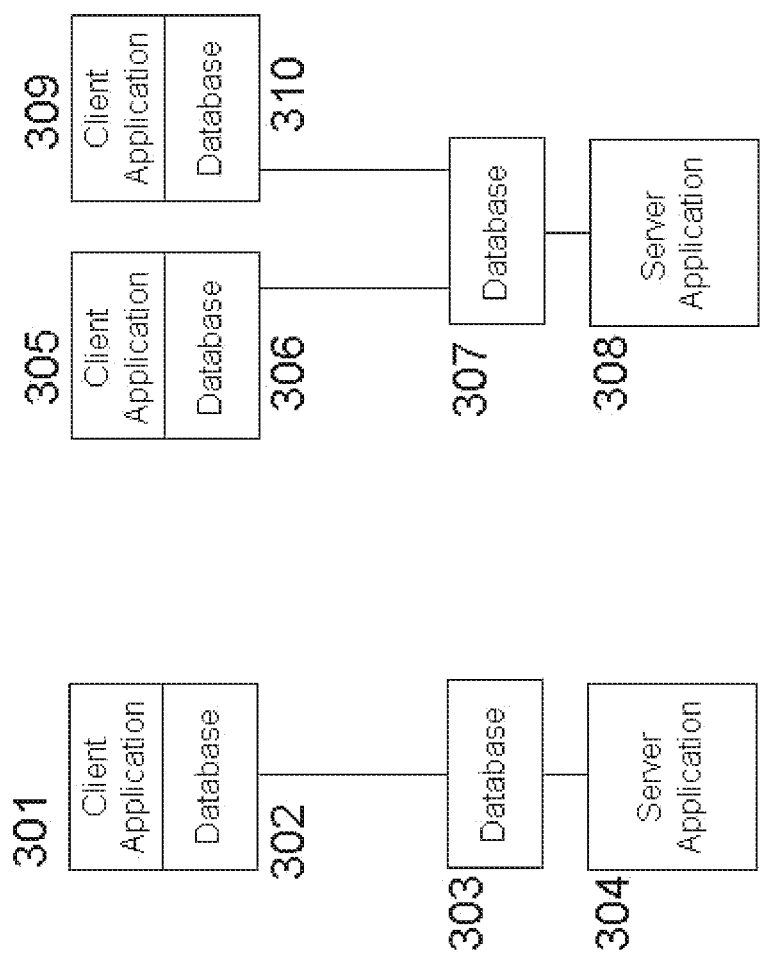

| 501 | Application | Application | Application |
|---|---|---|---|
| 502 | | HTTP | |
| 503 | | TCP | |
| 504 | | IP | |
| 505 | LAN driver | WiFi driver | GPRS driver |
| 506 | LAN NIC | WiFi NIC | GPRS NIC |

507 Route Table

Fig 5

WIFI AND CELLULAR COMMUNICATION SWITCHING

RELATED APPLICATIONS

This application claims priority to U.S. application Ser. No. 12/749,412, filed Mar. 29, 2010 and Ser. No. 10/677,098 which claims priority to Provisional Application Ser. No. 60/415,546, filed on Oct. 1, 2002, and Ser. No. 14/034,509 filed Sep. 23, 2013, the contents of which are hereby incorporated by reference in entirety.

BACKGROUND OF THE INVENTION

A. Field of Invention

This invention relates generally to client-server computing over multiple intermittent networks.

The Client-Server is an architecture that has long been in use within computing. It became popular with the advent with the Personal Computer (PC), which was used to access data on a central server. The simplest case of this is the File Server configuration where a set of files is stored on the server and accessed by the PC. Novell Netware and Sun's Network File System (NFS) are examples of technologies that were used to share files. Another popular client-server configuration is to have a thick-client application on the PC accessing a database on the server using standards such as Structured Query Language (SQL) and Open Database Connectivity (ODBC).

Tightly coupled client-server architectures indicate that the client requires access to the server to get information. If the server is not available, the client is essentially useless. Much of the client-server computing in use today is tightly coupled. The web browser is an example of a tightly coupled client-server model because it retrieves HTML from web servers. Without access to web servers, there is little that a browser can do.

Loosely coupled clients are independent of the server and access the server only when needed, such as to access or update information. Mail clients like Microsoft Outlook is a good example, where one can read and write emails while not connected to a mail server.

Most client-server computing has been deployed in a Local Area Network (LAN) or other always-on networks, eg. leased lines, dial-up. Therefore, it is not difficult to achieve a high level of reliability. There has not been a compelling need to introduce middleware to improve the reliability. Even so, applications that require transactional-level guarantees will use some kind of Transaction Processing middleware to track, audit and roll back transactions.

In addition, the assumption within a LAN is that there is only one network and that the cost of using it is essentially free. There has not been a requirement to choose among the use of multiple networks. Nor has there been a need to carefully consider the cost of using the network, eg. how many bytes are being sent or how long it is being used.

However, with the advent of wireless networks, this is all changed. Wireless networks are by their very nature intermittent since you are never guaranteed to have a clear signal. And often, there are places where there is no connection at all. Wireless carriers typically charge for usage of their network by the byte, so it becomes important how much bandwidth is being consumed. And there are multiple networks now available to computers, such as wire-line LAN, WiFi (IEEE 802.11b and successors), Wireless Wide Area Networks (GPRS, 1×RTT), Bluetooth and even a serial cable between a PDA cradle and a PC.

Another new issue raised by the use of mobile computers is the management of the devices and assets on those devices. In the current philosophy of network and system management embodied by software such as HP OpenView and CA Unicenter, there is an assumption that network elements or nodes (eg. computers, routers, switches) are always connected to the network and rarely move. It is therefore straightforward to manage the elements using Simple Network Management Protocol (SNMP) and deploy or update software on those stationary devices. However, with devices that are mobile, there is a new set of issues. These mobile devices are not always connected and if they are, they may be connected to multiple networks and therefore have multiple IP addresses. They might be shared among a group of users (eg. truck drivers who take any arbitrary handheld computer when the start their rounds). The devices must be secure but not impose a heavy price by slowing performance or sending exponentially larger packets on expensive wireless networks.

It is therefore plain that one cannot simply extend the current networking philosophy to computing on intermittent networks. In order to deploy usable and cost-effective client-server solutions that are mission-critical on intermittent networks, the goals should be transactional guarantee and manageability.

Transactional guarantee means that the system must keep functioning regardless of whether there is connectivity or not. No messages should ever be lost but they should be kept in reliable persistent storage at each step so that they can be recovered should a failure occur in the system such as a power outage. The entire system, consisting of the mobile devices and servers, must always be in a consistent state. Even when a failure occurs, the transaction should be rolled back or otherwise compensated so that there are no conflicts in any application. An example of this is when a transaction is to be committed to two applications; if one succeeds and the other fails, the one that succeeded should be rolled back so that they are both consistent. Only when both have succeeded should the transaction be committed. The system should be performant and not allow a fault to throttle the entire system, ie. cause it to stop working or go into an infinite loop and consume a lot of resources. This can happen when a message is in a queue that is fails to be committed to a target application and continues to retry constantly; this is called a "poison message" and should be immediately taken off the queue and processed differently. It should also be very resilient to faults such as badly formatted messages so that the system does not need to be restarted when responding to problems.

Manageability encompasses security, asset management, software deployment and cost control. Security covers the usual areas of authentication, authorization, encryption and non-repudiation There are many existing technologies that can meet these requirements. Mobile devices have additional requirement of remote locking when a device is reported lost or stolen. This can be done by sending a "poison pill" to kill the device and possibly destroy data or revoking the privilege to connect back to the server when it attempts to do so the next time a connection is available. Asset management refers to tracking the devices (eg. who owns it, where is it) and the management of the configurations on the device (eg. network settings, email settings). It is required that these are done set by a central system administrator and done automatically so that the user is not burdened to set up the configuration, which can be a complex and error prone process requiring much support. Another aspect of asset management is the ability to remotely run diagnostic test programs on the device. For example, the administrator might want to schedule the barcode scanner to be test every day and a report sent automatically when there is a connection so that he knows if the device needs to be brought into the office for maintenance Software deployment is an area that has received a lot of attention because of the high cost of keeping the correct versions and license of software on computers. This problem is compounded for mobile devices that you cannot physically check. Software deployment configurations must be set up by the administrator remotely, whether the device is connected or not. When a device comes on line, it must automatically know which software to update. The administrator must also be able to specify which network to be used for software deployment. For example, use the free WiFi or serial connection to update software and only use the expensive wireless WAN for sending urgent application messages. Backing up data on the device is also a requirement for devices that have substantial disk storage such as laptops. Cost control is a new requirement for wireless devices where it does matter how much bandwidth is being used. Because wireless networks are more expensive, slower and intermittent, it becomes important for an application to determine which messages should be sent on which networks. Urgent and important messages should be sent on any available network. Less urgent and important messages should wait until a cheaper network is available. Other factors might come into play, such as system or network constraints. For example, if a satellite channel is available, only the most urgent and small messages might be sent. If the time is after 5 pm or the battery is low, perhaps the pending messages should be flushed immediately on any available channel.

C. Description of Related Art

In order to enable reliable communication between applications across intermittent networks, several traditional techniques have been used. These have been adapted from LAN (Local Area Network) technologies. The major techniques are Asynchronous Messaging, Distributed Transaction Processing and Synchronization; which will be described in more detail below.

1. Asynchronous Messaging

Asynchronous Messaging has been used to integrate enterprise applications for many years. In FIG. 1(a), an Application 101 communicates to other applications using asynchronous messaging middleware. The asynchronous messaging middleware consists of a Messaging Client 102 and Messaging Server 104. The Messaging Client is a software library that is included by the Application and takes care of ensuring that a Message is sent to its intended recipient(s) via the Messaging Server. The Message consists of a Header and Body, where the Header contains envelope information such as the address of the recipient and the priority, and the Body is a collection of text that describes the content.

The Messaging Client 102 and the Messaging Server 104 communicate via a network 103. This network might be high bandwidth (eg. Local Area Network) or low bandwidth (eg. Dial-up). The network might be very reliable or intermittent. When a message is submitted by an Application 101 to be sent to another application, the Messaging Client will try to reach the Messaging Server and send the message to it. If it fails, it will store the message and automatically retry again.

There are two main ways to send messages using asynchronous message. One is point-to-point to request-response where an Application specifies the exact location of the target. For example, a message is sent to an enterprise application such as SAP or Oracle. The other method is publish-and-subscribe where a topic is specified and applications will publish to a topic or subscribe to a topic. A good example of this is the stock trading systems whether traders subscribe to stocks they are interested to track and the systems publish stock changes to a topic that corresponds to that stock ticker symbol.

There are several policies for the messaging guarantees. With the "at least once" policy, the message must be sent at least once; meaning that the message might be sent more than once and duplicates must be discarded by the application. This method requires more administrative overhead by the application but it is the very efficient. With "at most once", the message should be sent only once but there is a small chance that it might not be sent at all (ie. the message is lost). The most rigorous policy is "exactly once" or "once and only once", where there is a strict protocol between the Messaging Client and Messaging Server using unique message identifiers, retries and acknowledgements to ensure that the message is sent. With high reliable networks like Local Area Networks, it is likely that one of the less reliable policies is sufficient because the underlying network transport provides for the automatic resending of packets that might be involved in network collisions and are lost. In the case of unreliable or intermittent networks like wireless networks, then it is important that the more reliable policy such as "exactly once" is used.

Given the proven reliability and flexibility of asynchronous messaging, it is natural that vendors have considered extending this software paradigm to the wireless network or any other intermittent network. In FIG. 1(b), the way that most vendors have done this is simply by inserting a Gateway 108 between the Messaging Client 106 and Messaging Server 110. The Gateway is a piece of software that generally sits in the Demilitarized Zone (DMZ) of a firewall that protects a corporation's data assets. It provides protocol translation between the Messaging Client and Messaging Server. The Messaging Client 106 now talks to the Gateway 108 via the external network 107 instead of directly to the Messaging Server 110 because the Messaging Server is behind the firewall and is not directly accessible. The Gateway often provides security services between the Messaging Client and Messaging Server. The Gateway then translates and forwards the message on to the Messaging Server. It must maintain the same message guarantee policies that have been dictated by the administrator between the Messaging Client and Messaging Server. Note that the same protocol is in use so the communication between the Messaging Client and Messaging Server is very "chatty", as indicated by the thick black arrows 107, 109. While this works well when the network is mostly connected and reliable, it is not optimum for intermittent or unreliable networks such as wireless.

2. Distributed Transaction Processing (DTP)

Asynchronous messaging removes the headache for the application developer to ensure that the message was sent to another application, but it does not guarantee a correctly completed transaction. For this to occur, distributed transaction processing (DTP) theories have been developed and standards such as the X/Open XA Interface have been defined so that transactional applications can interoperate.

DTP can be accomplished by using a Transaction Manager (TM, also known as Transaction Authority) and asynchronous messaging. Asynchronous messaging is used to guarantee the transport of messages between the Transaction Client (TC) and Transaction Manager.

FIG. 2(a) illustrates the combination of asynchronous messaging and distributed transaction processing. While it is desirable to have transaction guarantees, many corporations do not have a transaction management engine such as BEA Tuxedo or Microsoft MTS. As such, they need to write the transaction logic themselves 213, along with the business logic and connector logic. This logic includes rolling back transactions that fail for all affected applications, whether they are online or offline. It is a complex undertaking and involves a lot of code that must be written and tested thoroughly.

In addition, a traditional DTP protocol adapted from the wired network model FIG. 2(a) would require that the messaging client 202 wait for an acknowledgement from the target application; this means that it needs to hold the connection open for the message to make a round trip all the way through the transaction logic 201, 202, 203, 204, 205, 206, 213, and back through 206, 205, 204, 203, 202 and 201. This roundtrip could potentially take a long time, especially if the transaction is targeted for multiple backend applications. In this time, a timeout could have occurred between the messaging client and messaging server, which would require a new session to be established. It also consumes more bandwidth than is necessary.

Given the abovementioned deficiencies of applying the wired network model of DTP, it is desirable therefore to amend the implementation while providing the same level of transaction guarantee. This is illustrated in FIG. 2(b) where a message from an application is handed off to the gateway 210 which releases the connection right away so that the application does not have to wait for the acknowledgement from the target application. The gateway takes care of ensuring that the message is properly submitted to the transaction manager. Since the logic for the transaction manager is generic, it should not be rewritten for each application but should be a separate module 214. When a reply is generated from the server application 215, a new connection is then established to send the message to the application 207. With this model, the roundtrip is much abbreviated: 207, 208, 209, 210 and back through 209, 208 and 207. The gateway takes care of sending the message to the application: 210, 211,212, 214 and 215. Any errors, rollbacks or replies are sent to the originating application with a new connection: 215, 214, 212, 211, 210, 209, 208 and 207. This implementation is more efficient because it minimizes the connection time required and the chances for timeouts. By abstracting the transaction logic, this also dramatically reduces the code that needs to be written by an application programmer.

KonaWare implements the model in FIG. 2(b) in addition to other innovations for intermittent networks. This will be described in more detail in the disclosure section.

3. Synchronization

Synchronization is a general term that is applied to a set of technologies that compares two different datasets and makes them the same by copying the differences to each one. The use of database replication by Lotus Notes was one of the first widespread uses of synchronization. The Personal Digital Assistant (PDA) makes use of synchronization to ensure that things such as the calendar, contacts database, notes and email are up-to-date on both the PDA as well as the PC. Palm was the first company with a simple and successful synchronization mechanism. Synchronization can also be applied to any content, files or unstructured databases (eg. Avant Go). There have been many innovations in synchronization. Some use timestamps (although this requires that the date and time must be in sync at all times). Others use markers or bookmarks to indicate the last update.

Synchronization offers a very simple programming model for the application developer because they are already used to programming against a database. However, it has a major problem that occurs whenever the same row and column of a table of the client database 302 and server database 303 are changed. When the database is synchronized, there is no way of telling which update should win. This is known as a synchronization conflict. Some databases offer the option of allowing the server to always win or the client to always win, but this is too simplistic and will fail in most cases.

Synchronization works well if there is only one client application and one server application, and that both of these are controlled by a single entity as illustrated in FIG. 3(a). When a synchronization conflict occurs, that single entity is able to decide who will win. In the example of a PDA, the same person has entered an appointment in both the PDA and the PC database. When the databases are synchronized, that person will know which one is correct. The synchronization application typically raises this as an exception that needs to be manually handled.

Handling exceptions manually is bad practice for enterprise applications because there is generally no single person who can definitively resolve all the synchronization conflicts. This is clear when one considers the scenarios in FIG. 3(b) and FIG. 3(c). In FIG. 3(b), there are two client applications 305, 309 which are updating their client databases, 306, 310 respectively. Both of these could be updating the same row and column of the same table. When the databases are synchronized, there is no way of telling which application should win. This can be generalized to multiple client applications and the problems are compounded. Some implementations segment the databases such that each client database has its own copy so that it would not conflict with another client database. However, the problem of conflicts arising from the server application and client application updating the same row and column still exists.

FIG. 3(c) illustrates a typical configuration in enterprises where there are multiple client applications 311, 316 and multiple server applications 314, 315. All synchronization is done through a central database 313. Given that it is intractable to have automatic exception management of synchronization conflicts in even a simple case such as 3(a), it is impossible for this case. Certain packaged applications have been able to use database synchronization by carefully ensuring that updates are made in different rows of the table. But it is not a generalized methodology that is useful for custom applications. It is therefore not surprising that database synchronization has not been successfully deployed for many custom enterprise applications.

In order to make database synchronization work automatically, there needs to be a master server database and client databases that are subservient to it, ie. slave databases. In the configuration shown in FIG. 3(c), the server database 313 would be the master database. It is the final arbiter of updates among the databases. The server applications 314 and 315 must communicate with it transactionally. The client application 311, 316 cannot assume that an update to its client database 312, 317 is committed until it has been confirmed by the server database 313. Such updates are considered pending until there is a connection to the server database. This puts more of a burden on the client application developer and user, but it will eliminate the need to manually handle exceptions, which is much more costly in the long run.

KonaWare combines this type of database synchronization for tables that are usually static and make sense to use this technique. It is described in more detail in the disclosure section.

4. Networking

Networking has evolved over the years to standardize largely on the Internet (TCP/IP) and Web (HTTP/HTML) standards. The networking philosophy is based on separating protocols into a series of distinct layers or stacks. The OSI model is useful for understanding the networking model and is illustrated in FIG. 4(a), where:

Physical layer 407 connects devices to networks
Data link layer 406 detects and corrects errors
Network layer 405 routes the transmissions
Transport layer 404 ensures message integrity
Session layer 403 controls the start/end of a session
Presentation layer 402 translates data to the appropriate rendering format
Application layer 401 presents the information to the user
TCP/IP is a set of protocols that corresponds to the OSI model as shown in FIG. 4(a) and FIG. 4(b), where:

IP 412 is a connectionless Internet Protocol that offers no guarantees for sequence order or error detection and correction
ARP 412 is the address resolution protocol
TCP 411, the transmission control protocol, is connection-oriented, sends packets in-order, and does error checking and correction using acknowledgements, checksums, flow control, retransmit and sequencing
UDP 411 is user datagram protocol, a fast and unreliable protocol
Telnet 410 is a protocol for remotely logging into other computers on the network
NFS 409 is the network file system, a de facto file access standard created by Sun Microsystems
DNS 409 is the domain name services
FTP 408 is the file transfer protocol used to exchange files between computers
SMTP 408 is the simple mail transfer protocol which is used by email clients and servers for exchange electronic mail FIG. 5 illustrates how multiple networks are integrated within a computer using the TCP/IP model. In this example, we assume the computer can access three networks: a Local Area Network (LAN), an 802.11b Wireless LAN (WiFi) network, and a GPRS Wireless WAN network. The computer requires an interface card for each network, represented by the appropriate Network Interface Card (NIC) 506. Each NIC comes with a software driver 505 that converts the physical signals from the network into the transport protocol that the computer understands. The driver also enforces security that is required for that network. Each NIC is assigned an IP address by the network, which the operating system uses to route traffic using that NIC. By plugging into the appropriate stack on the operating system, the network is transparent to the user and application 501 that sits on top of the networking stack. This separation into layers makes it very convenient because neither users nor applications need to be concerned about which network is running In addition, the application developer does not have to port the software to various network transports but only has to write to the highest level provided by the underlying operating system such as HTTP or sockets. The operating system takes care of loading the various drivers of the NIC's to enable the networks. Different operating systems will have different policies for which network has precedence.

Since the applications cannot discern which network is running and the networking philosophy is based on one network being available, operating systems have to decide which one is the default network (or default route). Often, the latest network that was loaded is the default route. This means that all traffic goes through that network even though the other networks are available. The other networks are still available and can be directly used by addressing it via its IP address. Some applications will want to route traffic from one network to another; such as router software. The operating system keeps track of the networks in a route table 507 and this determines the precedence of each network as well as the default route.

Some operating systems allow static configuration settings that set up simple rules or policies on how to handle multiple networks. The administrator of that computer must be very knowledgeable to set up this configuration. But since this is static, there is no way to change the default route based on specific characteristics of the application data (eg. very large files), system parameters (eg. time, battery level) or cost of using a particular network.

The assumption is that a network is always available once it is up. If it is not available, then a timeout occurs, resulting in unpredictable application behavior. With the advent of Wireless WAN's, applications need to be intelligent to handle network outages because a wireless network will not always be available. In addition, certain networks are more expensive to use than others (eg. Satellite) and should therefore be used sparingly and only when high priority messages are to be sent or received.

Where there is an important need to decide which network to use, applications today have been specially written which know exactly what types of network to use and have hard coded policies to decide when there are multiple networks available.

In addition, the network routing philosophy of "least cost routing" simply looks at the currently available networks and sends messages on the route that it deems to be the lowest cost. However, there are times when that is not desired, for instance, when a message should be sent only using a particular type of network resource or cheaper, otherwise, it should be held on the device because it is not of any particular urgency to be sent.

5. Integrated Development Environments

There are many Integrated Development Environments (IDE) available on the market for developing client and server applications. Among the dominant players are Microsoft's Visual Studio, IBM's WebSphere Application Developer and Sun's NetBeans platform. There are versions that are modified to develop mobile applications on the most common platforms such as Microsoft Windows CE, PalmOS, RIM OS, J2ME and Personal Java. These IDE's subscribe to the procedural method of programming for the device. In other words, the developer has to write a lot of code describing exactly what the application has to do. The advantage is a lot of control over the specific look-and-feel and behavior of the application. The downside is that the developer has to port to application to every different target platform. For example, the Windows CE program must be rewritten for the Palm or the RIM Blackberry. However, with the many different form factors of devices, this will result in a lot of additional development and maintenance to support multiple platforms.

There is another popular paradigm, which is the forms-based methodology for creating applications. This is useful to define database-centric applications that do queries and display the results, or for web applications where HTML is generated. Oftentimes, scripting is provided as an option to further specify behaviors. But this method does not give the low-level control that many developers want. This is important because the small screen and form-factor makes usability a paramount issue in handheld software design.

An alternative methodology is based on the declarative model, where business objects are modeled and their data is poured into graphics objects. This model is often used by packaged applications (eg. PeopleSoft) to customize the modules because the business objects and GUI (Graphics User Interface) are all well defined. The customization is exposed to the user via a set or property sheets. It is a powerful methodology because it enables the most productive development environment by generating most of the "glue" code between the business and graphical objects. However, it suffers from the same shortfall as the forms-based paradigm, which is the lack of low-level control over graphical objects.

It would be ideal to have an IDE that is based on the declarative model that a developer can use to create general loosely-coupled client-server applications. The IDE should also provide the ability to import specialized graphical objects in order to allow fine control over the behavior of the application, which is critical to usability.

KonaWare proposes this type of IDE using XML as a specification language, thereby making it open and not locking the customer into any specific environment. In addition, this can be implemented as a standalone program or as a plug-in to the popular IDEs.

6. Mobile Device Management

There is an emerging market segment for mobile device management tools because of the proliferation of mobile devices; starting first with the laptop and now with the different types of PDA's and tablet PC's that run various operating systems from Microsoft, Symbian, RIM, Palm, Linux, etc.

Until today, mobile device management largely consists of managing Microsoft Windows-based laptops. Functions such as asset management, software deployment, security management, configuration management and automatic backup/restore are some of the common features in the vendors' offerings.

Managing devices that are connected via intermittent networks, or multiple networks, presents new challenges and requirements. The management agent on the device needs to have a reliable asynchronous messaging communication with the server because the connection could drop at any time. For software deployment and backup/restore, there needs to be a provision for selecting which network to use since it might not make sense to send large updates through low-bandwidth and intermittent wireless WAN's. The management agent must be able to run diagnostic tests, reconfigure the settings should they be corrupted, and send regular reports back to the server.

SUMMARY OF THE INVENTION

A system includes a server; a plurality of wireless networks coupled to the server; and one or more mobile devices coupled to the wireless networks with intermittent access to the wireless networks, the plurality of wireless networks providing messaging between client and server applications over multiple intermittent connections.

Implementations of the above aspect can include one or more of the following. The system provides bi-directional transactions between wireless/mobile devices and enterprise server applications. Transactions are achieved between client and server by breaking up the sequence such that the client does not have to wait until the transaction is completed before relinquishing the network connection. By using asynchronous messaging, the message is persisted at every step and can be handed off to the next stage without waiting. The reply from the server comes back to the client as an asynchronous message and completes the transaction. Bi-directional messaging is achieved using server-initiated push techniques such as modem signaling, http listener, SMS or polling using an efficient decaying algorithm. Messages are sent via communication channels that can be a combination of a physical network and a service provider. Networks are automatically detected by observing changes in the TCP/IP route table and configured by altering the default route. Service providers are determined by using identification servers accessible only in specific networks; if reachable, then it is that network. Transmission rules are formed using regular expressions to combine system, message and channel parameters. These are changed at any time and sent dynamically as system messages to target devices. Conflict-free database synchronization is achieved by assigning a master database and making the others slave databases whose updates are considered pending until confirmed by the master database. A lightweight LUCID (Logic Up, Consistent Information Down) model works by sending acknowledgement messages instead of the entire reply record.

One embodiment enables computing devices (including devices acting as clients, servers or both) using intermittent networks to have the same quality of service as traditional LAN-based transactional systems but doing so in a much more efficient manner It also addresses the challenges of using multiple networks that have different costs associated with them. In order to achieve these objectives, one embodiment is to use current distributed transactional processing theories and rework the sequence diagrams so that each step of the process is self contained and does not depend on holding on to a constantly connected network in order to receive the acknowledgements. The use of asynchronous messaging with the once-and-only-once policy is the underlying infrastructure for the system. Therefore, a device using an intermittent network can send a message and once it is assured that it has been received on the other end, it does not need to keep the connection open. The method involves the assignment of a queue for each user/device, a queue for each server application, and a set of system queues for audit and exemption handling. By automatically creating these queues, the system makes it very simple and straightforward for any entity to create transactional applications without a lot of knowledge about messaging or transactions.

With the advent of devices that use multiple networks, some of which might be intermittent like wireless networks, this invention uses policy-based routing to enable the administrator of a corporation to dynamically select which networks to use for which messages. This will allow small urgent messages to be sent via expensive wireless and larger less urgent messages to be sent by cheaper networks. Since the dominant network protocol TCP/IP abstracts the lower-level layers, it is not possible to achieve this without first identifying and configuring each network. In addition, a network is accessed via a physical Network Interface Card (NIC) that might be used to access different services, like a WiFi card can be used for both a free campus network and a commercial service used at a café. Different combinations of NICs and service providers enable different communication channels. The service that is currently active can be determined by using identification servers in the different networks that are only addressable when that particular service provider is active. Then a set of rules can be created for a set of devices and sent to them dynamically using the same asynchronous messaging mechanism as for the transactions. The rules can be based on system parameters (time, memory, power), or message parameters (priority, size), or channel parameters (cost, speed), or historical data. These system messages are intercepted on the device by the management agent that creates a set of rules that are evaluated whenever there are messages to be sent and at least one channel is available.

In order to achieve database synchronization that does not have any synchronization conflicts, it is necessary to first assign a master application that is the final arbiter of database operations (create, read, update, delete). All other databases are considered slaves and their database operations are considered "pending" until they have been verified and acknowledged by the master application. Therefore, when a connection is available and the synchronization is started, the slave database is tagged "in flight" and the master updates its database accordingly. Then the entire updated record is sent back to the client and then and only then is it marked complete. Conflicts do not occur because the client must update its database based on the record sent back by the server, even if this is the update that is sent. The application can then decide to send a new update or leave it as is. In any case, the master and slave databases are always in sync. This is known as the LUCID (Logic Up, Consistent Information Down) model, which was first put forth by the Informix (now IBM) Cloudscape project. LUCID was developed for databases that occasionally connect and sync up.

In applying this to intermittent networks, the lightweight LUCID model is prescribed, as discussed in greater detail below. This is the same as LUCID going up—data is processed using business logic, however, there is no requirement for the consistent server image to be sent back to the device. The server can just send an acknowledgement using a separate asynchronous messaging channel to indicate the data was received and process or a 'fault' to indicate any problems. This is much more efficient and allows real-time consistent database synchronization In order to create loosely coupled client-server applications, an integrated development environment (IDE) needs to be cognizant of the transaction model used. The method described in this invention involves the use of declarative programming to define the structure of the client and server without any coding. This is achieved by a methodology for untethering the client application from the server. The first step is defining a standalone client application with its own database that operates regardless of the existence of a connection to the server. The second step is to define the server portion (eg. Java Bean or Web Service client) using the widely used Model-View-Controller pattern that acts like a tethered client to the backend applications. The final step is to define the messages between the client and server portion. The graphical user interface is defined by mapping the business objects to graphical objects.

An integrated system that includes the deployment of the client and server software to the appropriate client and server devices simplifies the typical separate development and deployment processes. By defining a single package consisting of the client, the server and gateway URL (the address of the queue that identifies the server application), there is consistency built into the process because the relationships are strongly enforced and not allowed to be broken. The deployment system also allows the assignment of arbitrary applications to groups of users who have different types of devices. The system first defines the users and groups, and then assigns devices to users. Devices belong to a platform that designates a group of operating systems that can run the same programs (eg. Windows 2000, Windows XP). Then packages are defined and linked with groups. The system figures out which devices should get which applications by matching the application platform and ensuring that devices only get applications that are targeted for the correct platform.

There are several methods to achieve server-initiated push messaging to remote clients. If the device operating system or network interface card (eg, wireless modem) provides a way to signal the device and invoke a program, then this can be used to wake up the client so that it pulls messages from the server. If the device is addressable, then a small listener application can be running on the device so that the server can send a message to that listener to wake up the client application to pull messages. Finally, even if the abovementioned are not available, the device can poll for messages using various algorithms to increase the chances of getting messages while reducing the bandwidth. One algorithm is the decaying algorithm that increases its polling frequency whenever a message is sent because it expects a response from the server. When no messages are being sent or received, it reduces the frequency so that it can save bandwidth.

BRIEF DESCRIPTION OF THE DRAWINGS

The foregoing and other objectives, aspects, and advantages will be better understood from the following detailed description of the embodiments of the present invention with reference to the following drawings:

FIG. 2(a) shows how a transactional system can be built for intermittent networks using asynchronous messaging.

FIG. 2(b) shows a more efficient transaction system using asynchronous networks and separating out the transaction logic.

FIG. 3(a) shows a simple database synchronization configuration where there is only one client application and one server application.

FIG. 3(b) shows a database synchronization configuration where there are multiple client applications and a single server application.

FIG. 3(c) shows a database synchronization configuration where there are multiple client applications and multiple server applications.

FIG. 5 shows how a computer implements the interfacing to multiple networks.

DETAILED DESCRIPTION

The system provides efficient and transactional messaging between client and server applications over multiple intermittent networks.

A. High Level System Configuration

Figure 1B:
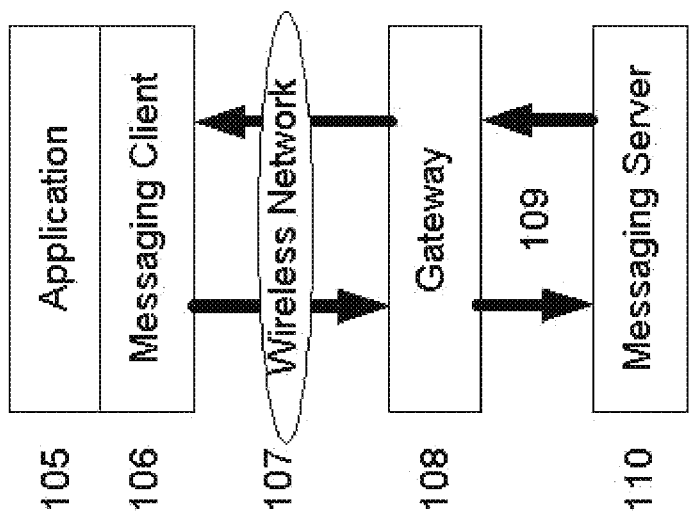
FIG. 1(b) shows a typical extension of asynchronous messaging to intermittent (eg. wireless) networks.
Figure 1A:
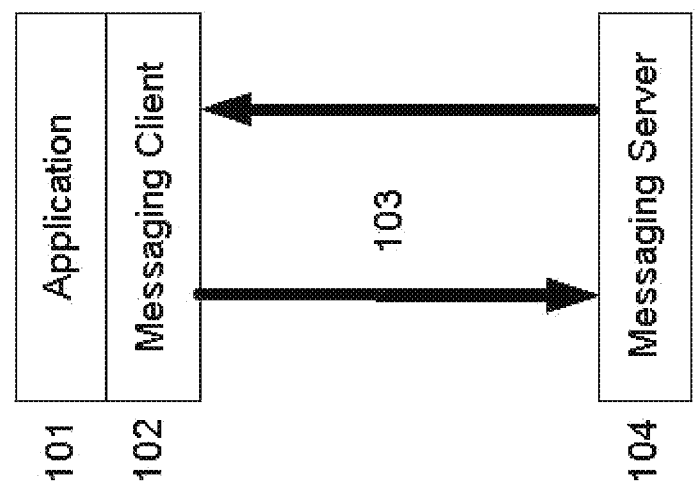
FIG. 1(a) shows the concept of an application with reliable communication to a server using asynchronous messaging.
Figures 4A, 4B:
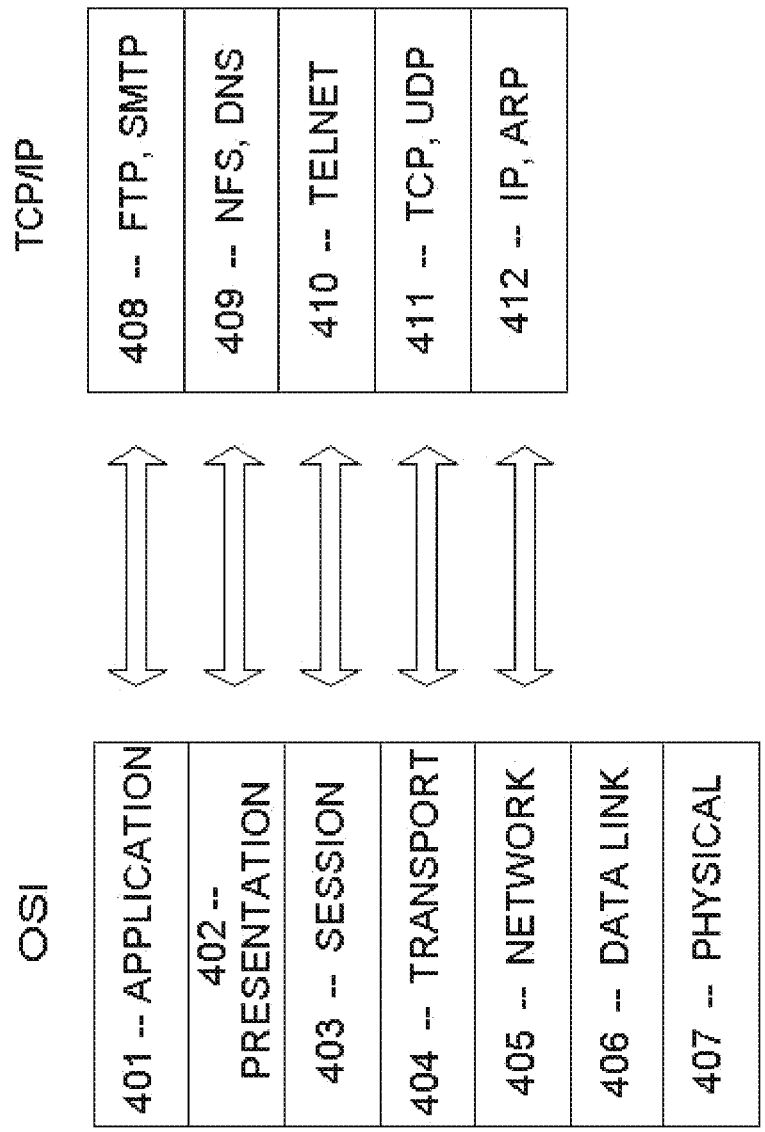
FIG. 4 shows the network stacks for the OSI model and TCP/IP model.
Figure 6:
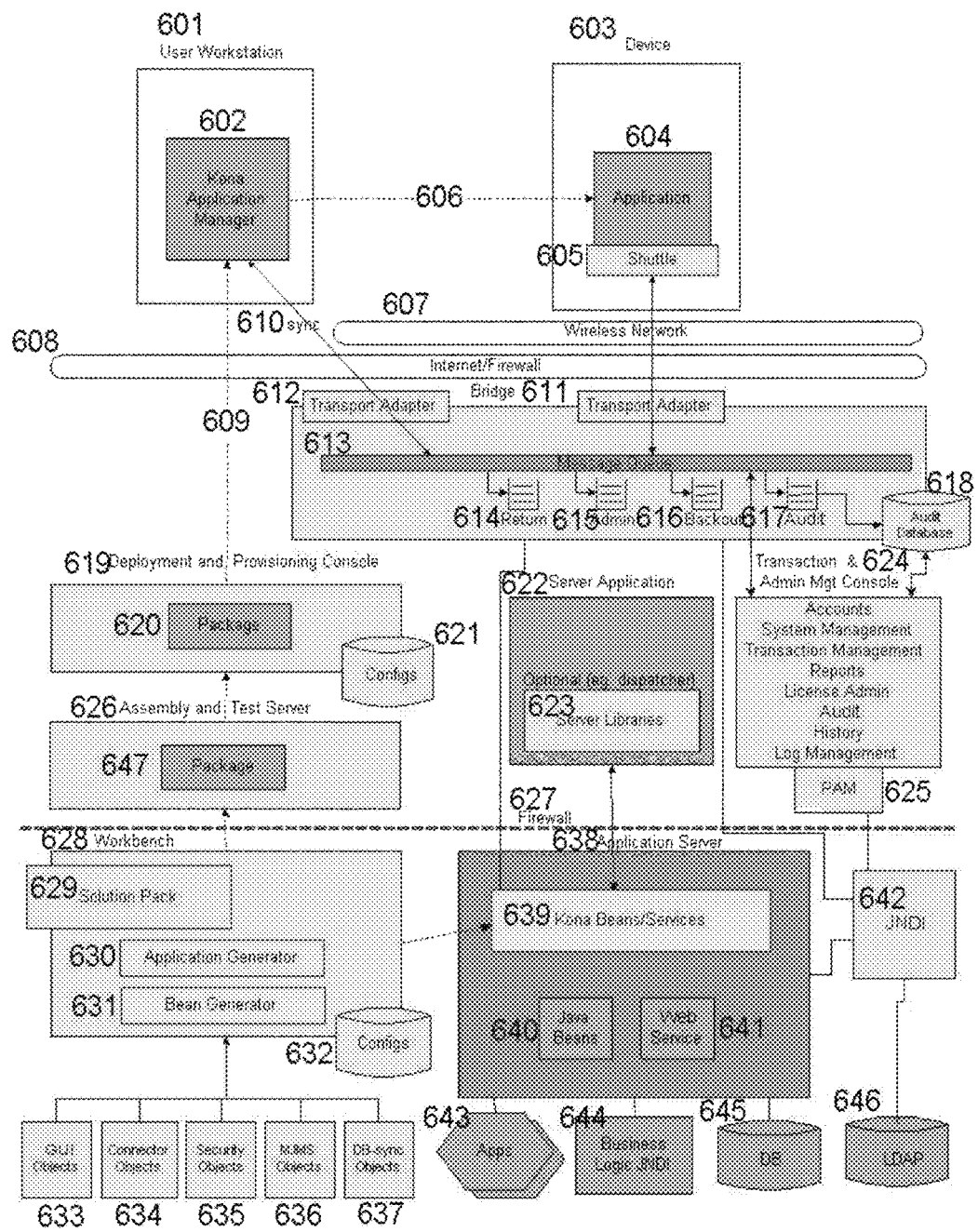
FIG. 6 shows the high level components of a distributed transactional system for intermittent networks.

FIG. 6 shows all the major components of the system and how they are connected to each other.

The transactional components are the Device 603, the Bridge 611, and the Application Server 638. Within the device, the application 604 sends messages to the server via the Shuttle 605. The Shuttle talks to a particular network through the appropriate Transport Adapter 612. The Transport Adapter is a piece of software that translates the protocol between two networks. For example, if one uses HTTP as the application level protocol and UDP as the underlying transport, the Transport Adapter would perform the appropriate translation as well as additional services such as session management, reliability, checksum, etc. This allows the Shuttle and Bridge to adapt to new networks without having to undergo any code changes. Messages are sent between the Shuttle and Bridge; with both sides persisting the message in storage until the other side has acknowledged receipt. Messages on the Bridge are kept in a Message Queue 613. The Message Queue can be any asynchronous messaging server offering "once and only once" guarantees. The Java Messaging Services (JMS) standard from Sun Microsystems is popular with enterprises and is implemented by various messaging vendors such as BEA, IBM, TIBCO, Vitria. The system uses queues in the Message Queue server. There are several system queues such as the Audit 617, Admin 615, Backout 616, Return 614 and Command queues. Queues are also created for users and applications. The Audit Queue is used by the system to store messages that have been processed and are archived into the Audit Database 618. The Admin and Command queues are used by the system to send commands. The Backout queue, also known in messaging literature as a "dead letter queue", is used to store messages that fail to be processed by the target server application. The Return queue is used to store messages that fail to be processed by the client application. The Kona Beans/Services 639 runs inside an application server 638. This module might be implemented as a Java Bean or a Web Service. If the deployment is based on Java, the Kona Bean is a Message-Driven Bean that pulls messages from the Message Queue and interfaces with other Java Beans 640. If the deployment is based on Web Services, then the module is a Web Services Client and is a standalone application that reads/writes messages from the Message Queue and communicates with Web Services 641. The Java Beans 640 or Web Services 641 can communicate with other backend applications such as standalone applications 643, or databases 645. It can use naming services like JNDI 642, 644. Optionally, new server applications 622 can be developed that access the Kona Beans/Services 639 using server libraries 623.

The cost minimization system consists the Shuttle 605, the Networks 607, the Message Queue 613, the Administration Management Console 624 and the Workbench 628. The client application developer assigns priorities to messages using the Workbench. The administrator uses the Administration Management Console 624 to set up rules to determine which messages should use which network based on the message priority or other system parameters. These rules are then sent to the appropriate devices 603 using the Message Queue 613. The Shuttle 605 evaluates the rules and determines when to send messages and on which network 607. The network might consist of one or more networks; they might be the same type of network (eg. several GPRS carriers servicing different geographic areas), or different (eg. WiFi, LAN).

The development components are the Workbench 628 and associated libraries 633, 634, 635, 636, 637. The Workbench is an Interactive Development Environment (IDE) where a developer creates the client application by defining the look-and-feel of the Graphical User Interface (GUI) and binding business objects from the server applications. A plug-in architecture allows pre-packaged application templates called Solution Packs 629 to be imported into the Workbench. The Workbench allows developers to select from object libraries such as GUI 633, Connector 634, Security 635, MJMS 636 (mobile JMS, or any other message queue to interface with other applications) and Database Synchronization 637. Adding configuration information from the Configuration database 632, there is sufficient information for the Application Generator 630 to generate the client application, and for the Bean Generator 631 to generate the server side bean or web service client 639. The client application and server bean/service are associated together as a Package 647 and submitted to the Assembly and Test Server 626 after they have been developed. This association allows the client application to communicate with the correct instance of the server bean/service. The server bean/service is deployed into the application server or web service client 638 upon successful testing. Since the client and server use a common application queue in the Message Queue 613 to communicate, this queue can be assigned or automatically created by the Administration Management Console 624 upon deployment of the server bean/service.

The deployment components consist of the Assembly and Test Server 626, the Deployment and Provisioning Console 619, the User Workstation 601 and the Device 603. The Workbench 628, described in the previous paragraph, pushes the application package 647 to the Assembly and Test Server 626 that is used to store all raw untested packages. Once the package has been tested on the target devices and networks, it is moved to the Deployment and Provisioning Console 619 where the package 620 is staged until it is ready to be deployed. The administrator sets up the groups of users and devices that should get this package 620 and the information is stored in a configuration database 621. The package is sent to the target device 630 either directly through a network (which could be a LAN, or over-the-air via a wireless network) or kept on a User Workstation 601. The User Workstation has a simple Application Manager 602 that knows when a device is connected. For example, a device might be connected via a serial cable 606 when it is placed in a cradle using software such as Microsoft ActiveSync for PocketPC handheld computers. Using a User Workstation 601 to park applications allows multiple devices to share a single workstation, or have a device updated from a workstation during a convenient time when it might have been disconnected. For example, a mobile worker might plug into a LAN momentarily to retrieve emails and the Application Manager 602 pulls up the latest client software for his Device 603. When the user has his workstation disconnected, the packaged can still be loaded onto the Device. This is useful in situations in a hotel where a laptop workstation uses the dialup network and the device is attached to the laptop and can effectively share the network by use the application manager to update its applications and data.

B. Detailed Architecture

Figure 7:
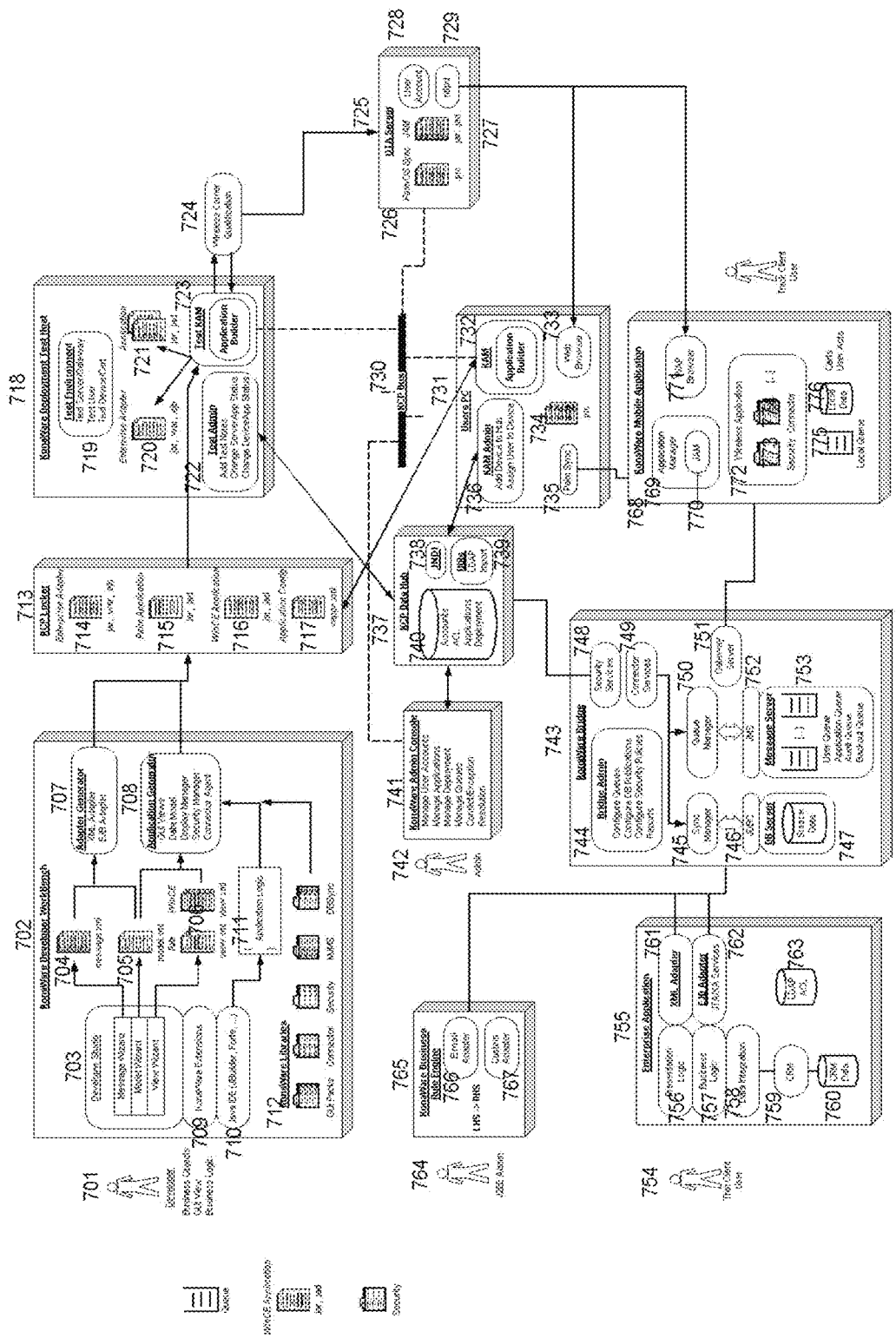
FIG. 7 shows the detailed architecture for the KonaWare implementation of a distribution transactional system for intermittent networks, including modules for application development, application deployment, and system management.

FIG. 7 illustrates the detailed architecture for the KonaWare system. This is an embodiment of the system described in the previous section. The architecture provides the details of the required system modules, the files and database structures. It shows how all the components are integrated together so that there is no need to manually transfer configuration information from one component to another, as one would have to do using separate systems to perform these functions.

C. Efficient Transactional Messaging Between Loosely Coupled Client and Server Over Multiple Intermittent Networks with Policy Based Routing In order to achieve efficient transactional messaging between loosely coupled client/server applications over multiple intermittent networks using policy-based routing, the system will be broken down and described in several sections:
  1. Dynamic Cost Minimization for Wireless Networks Using Policy Based Routing.
  2. Guaranteed Transactional Messaging for Disconnected Mobile Client and Server with Automatic Retry and Rules-Driven Rollback.
  3. Conflict-Free Mobile Data Synchronization with Enterprise Applications.
  4. Automatic Generation of Untethered Mobile Loosely Coupled Client-Server Applications Using Asynchronous Message and Declarative Models with Guaranteed Transactions
  5. Central Administration of Mobile Devices Supporting Phased Deployment and Intermediate Application Parking on Disconnected Workstation
  6. Server Initiated Push and Throttling of Messages via Push Proxy to Control Transmissions
  1. Dynamic Cost Minimization for Wireless Networks Using Policy Based Routing This method prioritizes and transmits messages to/from a mobile device through multiple channels via a set of dynamically generated rules based on cost envelope and performance requirements.

Figure 8:
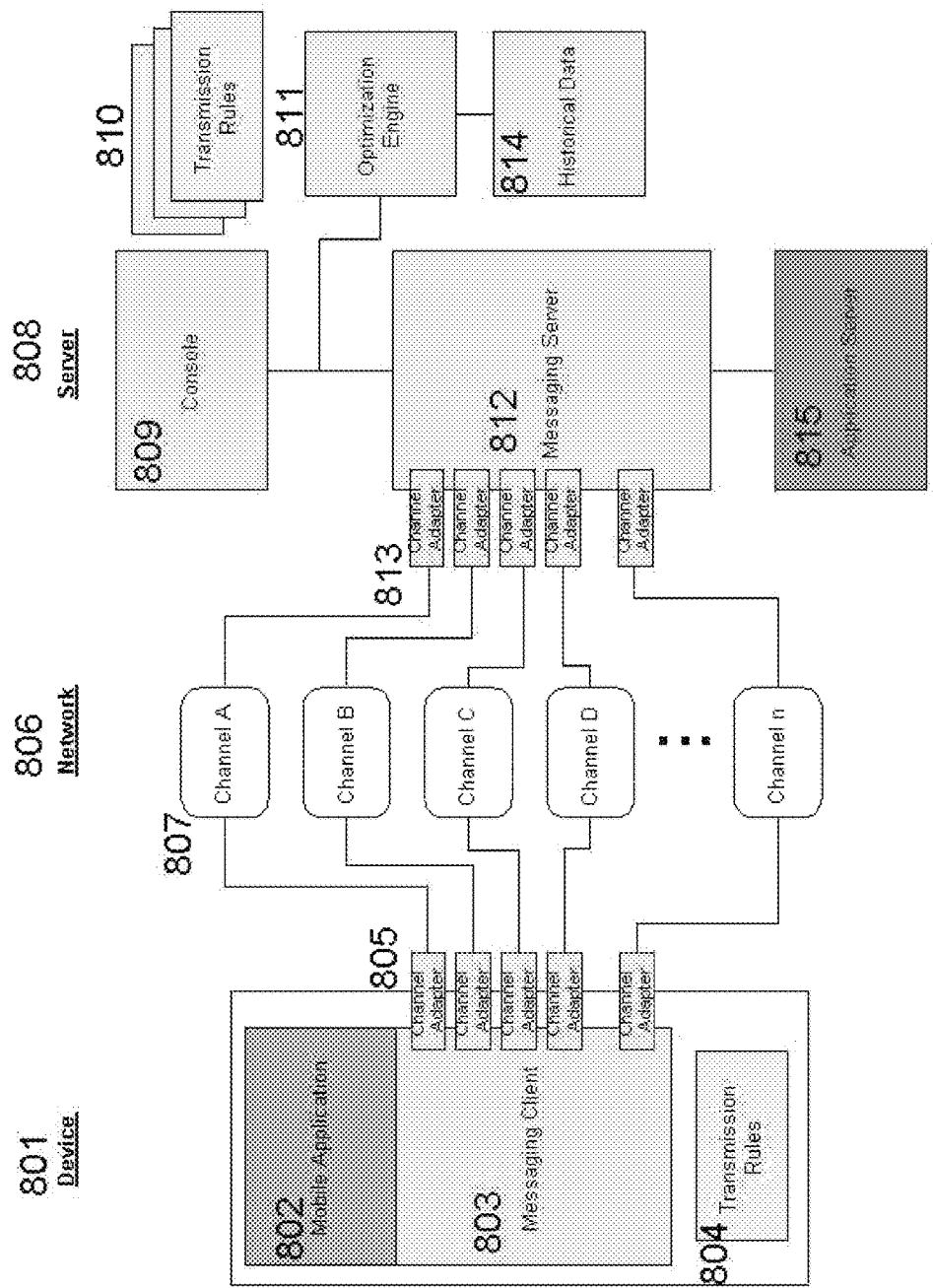
FIG. 8 shows the components of a system that is capable of detecting and usage of multiple networks.

FIG. 8 illustrates the architecture for this set of functionality.

The Device 801 is any computing machine with the following characteristics:
  Download and execute software
  Persistent memory
  Physical and service interface with one or more channels
  Internal clock
  Send and receive messages
  Examples of Devices are:
  Personal Digital Assistant (Microsoft PocketPC, Palm, RIM)
  Phone (Nokia, Motorola, Ericcsson)
  Computer (Microsoft Windows, Linux, Solaris)
  Appliance
  Monitoring device (eg. water, air, electricity, gas, temperature)

The Device could in fact be a physical server, but for the purpose of this discussion, is considered the client. While it must possess persistent memory to store messages when it is offline (not connected to the server), the Device is not the final master storage for the data, which is only for servers within enterprises.

The Application Server 815 is the hub into which enterprise applications are integrated. This is used to host the server bean or web service client for communicating with the enterprise applications in a transactional manner Examples of application servers are:
  J2EE Application Server (BEA WebLogic, IBM WebSphere)
  Microsoft.Net COM/DCOM/COM+
  CORBA
  EAI System (CrossWorlds, TIBCO, Vitria, webMethods, IBM MQseries)
  Web Service Client The Messaging System consists of a Messaging Server 812 and multiple Messaging Clients 803. It implements reliable asynchronous messaging. Examples of messaging systems include:
  IBM MQseries
  BEA MessageQ
  TIBCO Rendezvous
  Vitria
  webMethods
  seeBeyond
  Sun MessageQueue
  They typically have several modes, such as:
  Non-certified: very fast, no checks, messages may be lost
  Certified: guaranteed messaging, messages cannot be lost, slower KonaWare uses a standard off-the-shelf messaging system. It does not implement one. Other implementations may use a commercial messaging server or include their own version as long as it ensures the required guarantees.

The Mobile Messaging Client 803 is a special version of Messaging Client implemented by KonaWare. It is instrumented so that it does not automatically send messages but instead evaluates certain conditions based on a set of rules before sending. In the section on prior art referring to FIG. 2(a), it was discussed why simply extending the LAN-based messaging protocol was not good enough. This section explains why it is important to have a Messaging Client that is specially instrumented to pay attention to certain conditions so that it can choose the optimum network channel to utilize These conditions could be based on several factors. For example:

External:
  Geographic location (eg. local vs. roaming)
  GPS
  Temperature
  Time (eg. day vs. evening)
Message Parameters:
  Priority
  Size
  Security
Channel:
  Availability of channel(s)

Inbound messages are originated from the server and received on the device. The messages are pushed from the server. If the device is not addressable, then the device can poll for any new messages.

Outbound messages originate from the device and are kept in a persistent store called the Outbox. When the receipt of the message has been acknowledged by the server, the message is then deleted from the Outbox.

Each message is assigned a priority a priori by the developer of the mobile application. The range or priorities is 0-9. The default priority is 4.

The threshold determines if a message should be sent from the device or server based on the message priority. There is a different threshold value of Inbound and Outbound messages. The threshold can be set between 0-9. The default threshold is 4.

The threshold is not the only deciding factor regarding whether a message should be sent or not. The ultimate decision resides in the Rules Engine that evaluates all other factors.

The Messaging Client 803 and Messaging Server 812 communicate via the Network 806, which consists of one or more Channels 807 that represent network connections between the device and the server. Such channels could comprise a single link or multiple links (eg. wireless carrier & Internet).

For each Channel, there must be a unique Channel Adapter. Possible channel types are:
  Wireless Wide Area Network
    GPRS, GSM, CDPD, CDMA, TDMA, Mobitex
    Satellite
    Microwave
  Wireless Local Area Network
    802.11 family of protocols
  Private Radio Network
    FedEx
    Police/Emergency
  Personal Area Network
    Bluetooth
  Wireline Wide Area Network
    Internet
    Dial up
    DSL
    Cable
  Wireline Local Area Network
    Ethernet A Channel is a resource that has certain attributes:
Network interface: the protocol that it uses to communicate to the network
Service provider: the entity that is providing the network service. This could be a free service like a campus-wide WiFi network, or a paid service like a GPRS wireless account. Note that this makes it possible to have multiple Channels that use the same physical network interface. For example, the same WiFi NIC would be used to access the free campus network as the paid T-Mobile network at Starbucks. These would be treated as two different channels for our purposes.
Speed: how fast it can transmit the message
Cost: the expense of transmitting the message
Availability: whether it is available or not
Security: what level of security is provided by the channel
Maximum message size: what is the largest allowable message size A channel does not need to be available all the time. It may be available only intermittently or during certain times.

This versatility of Channels makes it difficult to distinguish between different services (e.g., a free vs. fee-based service) using the same NIC. There is no current standard for service providers to identify themselves to the NIC and therefore no way for a device to determine which service provider is currently active.

A method to distinguish which service provider is active is to set up identification servers in networks that use different addresses to tell which network the device is using. For example, it is easy to set up web servers that simply return an acknowledgement if it has been accessed; one for the internal LAN with a private URL, and one that is accessible from the outside network with a public URL. When a device has detected that a network is available (via the route table, for instance), it can differentiate between these two by trying each of the URL's. If the internal private URL responds, then it is using the free corporate WiFi. If it times out, then the device can try the external public URL. After this point, it cannot tell whether it is a T-Mobile or AT&T service. Most service providers will require a login to the network to establish the connection. In this case, the MessageCenter can be configured to invoke the login routine and be able to identify which service provider is active. Another less reliable method is to use empirical data such as known router IP addresses or default gateways for certain service providers (though these can change) or perhaps round-trip times from a "ping" (this is useful if the networks have very different speeds).

A Channel Adapter 805, 813 is a piece of software performs the following functions:
  Protocol Translation
  Active Status reporting
  Encryption/Decryption (optional)
  Compression/Decompression (optional)

The messaging protocol needed by this system is a simple reliable Messaging Service such as the Java Message Services (JMS) or other messaging systems. It is session-less and stateless. Each message is considered to be an independent and atomic transaction. The Adapter needs to translate the protocol of a particular network to this set of assumptions:

Minimum/Maximum Message Size
Message Handshake
Message Acknowledgement
Message Format
Large Message Decomposition, Sequencing and Assembly Typical session-based layers such as TCP/IP or UDP can easily be adapted. In this case, session management must be handled by the Channel Adapter (ie. setup and teardown of session). Even store-and-forward systems such as e-mail can be used, even though it is inefficient and requires long latencies and multiple acknowledgements to ensure reliability.

The Active Status of a Channel can be reported by polling the route table or be sent an event from the operating system (if this is supported).

Large messages will need to be broken into smaller messages and re-assembled at either the device or server. Each message has a unique GUID (Global Unique Identifier). If it is determined that the message must be broken into smaller messages, each sub-message has the same GUID and a Message Count field that specifies the order of the message and the total count of the message. For example, "MessageCount: 2, 10" means that this is sub-message #2 of 10 sub-messages. Sub-messages can be sent on different channels because each sub-message is simply considered to be just like any other message. So if a large message consists of 10 sub-messages and the first 2 sub-messages were sent on a GPRS channel, if a faster WiFi channel became available, the rules engine would evaluate that this was the preferred channel and automatically direct the other 8 sub-messages on the WiFi channel.

Messages can be encrypted if desired. The message header specifies the type of encryption. Messages can be compressed if desired. The message header specifies the type of compression.

The Console 809 is the application that the system administrator uses to enter and update transmission rules parameters. It presents a set of screens to the administrator to enter the rules and writes them into transmission rules files.

The Console manages the transmission rules grouped by User groups. Each group can have a separate set of rules, or all groups can have one general set of rules. Changes to the rules at the individual group level take precedence over the general set of rules.

The Console also summarizes and records the historical data into a database and uses that to feed the optimization engine.

The Transmission Rules 804, 810 format consists of a set of rules and corresponding actions if the rule is evaluated to be true. Each Rule and Action takes up one line. The Rule is specified first and then the Action, separated by a ";". The rule is terminated with a newline. In the KonaWare implementation, regular expressions are translated into the Reverse Polish Notation (RPN), which is a very efficient way to evaluate these rules on a low-powered handheld device.

In addition, the Rules file may contain configuration settings, such as the Rules Engine Cycle Interval (RECI). The RECI specifies how often it should evaluate the rules. Since this might be a computationally expensive operation if there are many complex rules, it is best to execute only when necessary, eg. when there is a change in the network availability or system parameter such as a WiFi channel becoming available or the battery is below 10%.

The Transmission Rules 810 are specified using Boolean logic. Specifically, they follow the regular expression format. The following operators should be supported.

| Operators | Definition |
| --- | --- |
| * | And |
| + | Or |
| ! | Not |
| == | Equals |
| > | Greater than |
| >= | Greater than or equals |
| < | Less than |
| <= | Less than or equals |
| ( ) | Parenthesis |

The operands are:
m=message
   m.size=size of message in bytes
   m.pri=priority of message
t=current time
l=location
md=mode
   l=local
   r=roaming
The actions are:
1=Send on any available channel
2=Send on a specific channel of cheaper
3=Send on a specific channel only
Optional parameters (followed by ":" after action) are:
C: Specify Channel:
   W=Wireless WAN
   L=Wireless LAN
   B=Bluetooth
   S=Serial
   I=Infrared
   Default=any channel
E: Encrypted
X: Compressed

EXAMPLES

| Rule | Action |
| --- | --- |
| m.size > 50000 | 3: C = S, X |
| If message size is > 50 Kbytes | Send using serial channel, compressed |
| (t > 0700) * (t < 1800)* m.pri >= 6 | 2: C = W |
| If current time is between 7am and 6pm, and message priority >= 6 | Send using wireless WAN channel or cheaper |

Aging is defined as the process by which a message's priority is increased over time such that it is not stuck in the queue for too long.
Aging rules:
Do not set aging
Increase the priority of a message by 1 every:
   XX minutes (set by administrator), or
   XX sends (set by administrator)
Maximum priority (default: 9)
Do not apply aging when:
   File size is >XX (set by administrator)

The Transmission Rules are sent to the target User and Device 801 by placing a system message with the rule in the Messaging Server 812. When the Messaging Client 803 picks up the system message, it automatically, without manual user intervention, updates its Transmission Rules

804. This enables the Administrator to update the Rules for a set of Devices dynamically, without having to individually set each one or write any new code. Most other Rules-based systems are hard coded and therefore difficult to change.

The Optimization Engine 811 is a server-side software application that optimizes airtime usage based on parameters defined by the administrator. Historical data 814 such as network usage (Wireless WAN, Wireless LAN, Serial) for the past several months are useful for accurately predicting future usage and setting alarms when usage is unusually high or low at particular times. The Optimization Engine can use the Historical Data to extrapolate usage for the current billing cycle by combining current and previous months data to offer more data points in extrapolation algorithm.

The Optimization Engine accepts various inputs that it can use for computing the optimum algorithm. Parameters might include:

1. Channels available
2. Cost of each channel
3. Message parameters
4. Historical data The algorithms within the Optimization Engine consists of:

1. Manual
2. Cost Minimization, Service Maximization
3. Historical Data

In Manual Mode, the Administrator decides the priority thresholds for Inbound and Outbound transactions; as well as pings, acknowledgements, etc.

In Cost Minimization, Service Maximization Mode, the algorithm computes a cost for each Channel and then determines the priority thresholds based on the cost envelope provided by the Administrator. It attempts to balance the cost and service by using standard min-max optimization techniques.

The Administrator provides the following inputs:
Cost structures of each Channel:
  Price Per Billing Unit (PPBU), for each channel
  Example, PPBU for Channel A ($PPBU_A$), Channel B ($PPBU_B$).
Target total cost of each Channel, per Billing Cycle
Expected volume of messages (by Billing Unit, ie. per minute or per byte)
Priority of messages that should be sent by expensive Channel ($Priority_A$)
Priority of messages that should be sent by inexpensive Channel ($Priority_B$)

The output of the Optimization Engine is a set of transmission rules that are used to feed the affected devices and server rules engines.

Figure 9:
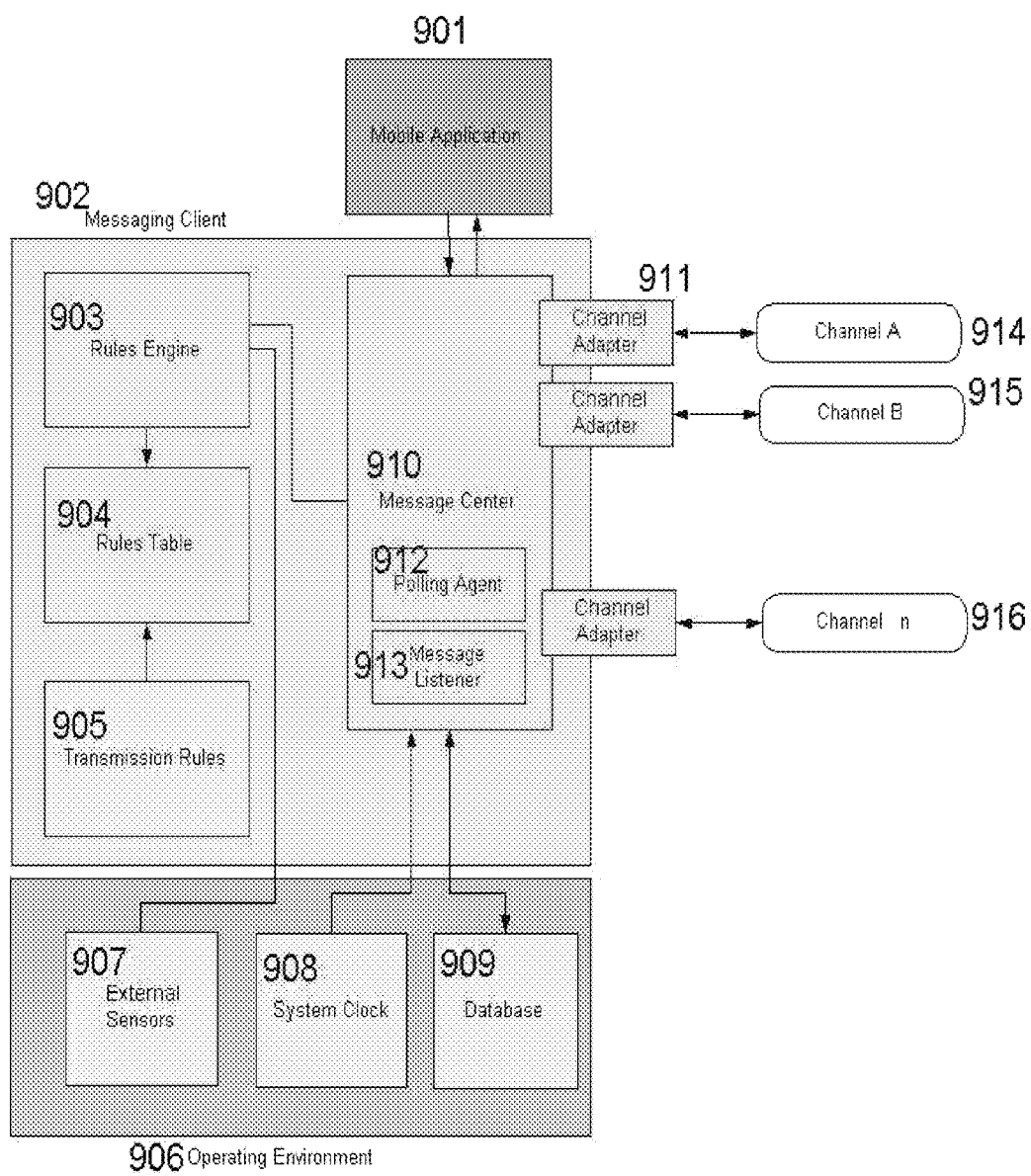
FIG. 9 shows the design of a client that implements policy-based routing using multiple networks.

FIG. 9. shows the Messaging Client in more detail. After a device has been loaded with Transmission Rules, it executes those rules immediately.

The Transmission Rules Engine 903 is a separate thread (or process) that is running on the Device. It operates on the Rules Table 904 and pulls messages off the Outbox. The Rules Table is a data structure in memory that represents the Transmission Rules 905 (which are kept in files). This enables the Rules to be evaluated much faster than if the Rules Engine had to pull them out of the Transmission Rules file. The Rules Engine interfaces with any External Sensors 907 and the Message Center 910.

The Rules Engine is invoked when:
An event occurs and requires evaluation
The system clock wakes it up every XX seconds (depending on the Rules Engine Cycle Interval setting) to look at the current situation (queues, connectivity, external conditions)

At each cycle, the Rules Engine evaluates the rules by performing the following actions:
  Checks for available channels. If none available, the engine goes back to sleep.
  Assigns Tags to each new message depending on the evaluation from the Rules Table.
  If an Aging rule has been set, it evaluates the messages that fall under the Aging rule and reassigns the Tags
  For each channel, it pulls messages off the Message Outbox and sends them out according to the tag The user or administrator can manually override the rules engine by sending a "flush queue" command. This flushes all the messages on a particular queue, regardless of assigned priority or other conditions. It is used when the user wants to send all messages to the server or for diagnostic reasons. The messages will be tagged as manually flushed so that the administrator can later audit the bandwidth usage.

No attributes of the original message (eg. priority) are changed. If no channel is available, no messages can be sent. If the user cancels the operation while messages are still being sent, then incomplete and unsent messages are left in the queue to be sent based on the normal transmission rules.

In order to achieve greater efficiency, each message is tagged such that it does not need to be evaluated through the entire rules table for each cycle.
  Messages are sent by:
  Specific Time, and/or
    Exact Time
    Channel Time Period (eg. Period 2, which is 5 pm-7 pm)
  Specific Event, for example:
    Channel is available
    Priority meets threshold for transmission
  Possible parameters are:
  Billing Cycle
  Billing Unit
  Tier
  Time
  Availability
  Urgency
  Override
  Batch Periodic
  Retry Frequency
  Ping Priority
  Ping Frequency
  Aging
  Rules engine cycle interval (seconds)—default to 1 second In most computing platforms today, networking is a hidden infrastructure and there is typically one channel only. In some instances, there are two channels (eg. Internet servers with two network cards and separate IP addresses). Routers typically have many channels because it is their function to route traffic between different networks. Most wireless PDA's have two channels: a Wireless LAN or WAN channel and a serial "sync" channel. Advanced multi-frequency radio devices might have multiple channels.

The issue is how to select among the various channels. To address this, the channel configurations are divided into the following modes.

Modes:
1. Single Active Channel, Manual Switching
2. Single Active Channel, Automatic Switching
3. Multiple Active Channels, Single Virtual Network
4. Multiple Active Channels, Multiple Networks In general, this method will require that all channels are presented as separate Channel Adapters such that the Message Client can select the appropriate Channel to send a message. But there is a way to do it even if all channels are abstracted as a single network. In computers implementing the TCP/IP stack, there is a Route Table 507 (discussed earlier in existing art, FIG. 5) that can be altered to reflect the policies set by the Transmission Rules. The Route Table includes entries like the IP addresses of each channel and the default gateway. A program such as the Message Center can alter the Default Route in the Route Table and therefore direct network traffic to a specific channel depending on the Rules Engine. This will affect all applications, but in many handheld environments, the user is typically only running one application.

In Mode 1 (Single Active Channel, Manual Switching), the user must manually switch between channels This can be done from the Mobile Application (if there are API's to switch channels) or from the device operating system.

Mode 2 (Single Active Channel, Automatic Switching) is a common mode for PDA's. For instance, the J2ME networking layer uses the wireless modem configured by the user when it is attached. When the wireless modem (Channel A, 914) has been disconnected and the PDA is now connected via a serial connection (Channel B, 915) that shares a network connection with a PC (eg. Microsoft ActiveSync Pass-Through or MochaSoft W32 PPP), the J2ME networking layer connects to that connection just the same and this is invisible to the application. In this case, the developer must create two identical channel adapters that use the J2ME networking layer; one for the wireless and another for the serial connection. For greater efficiency, the wireless Channel Adapter could use http/s protocol and the serial Channel Adapter could use the sockets protocol. The user will need to manually switch between the two in order to invoke the correct Channel Adapter. Alternatively, the Message Center can change the Default Route as described above.

Figure 10:
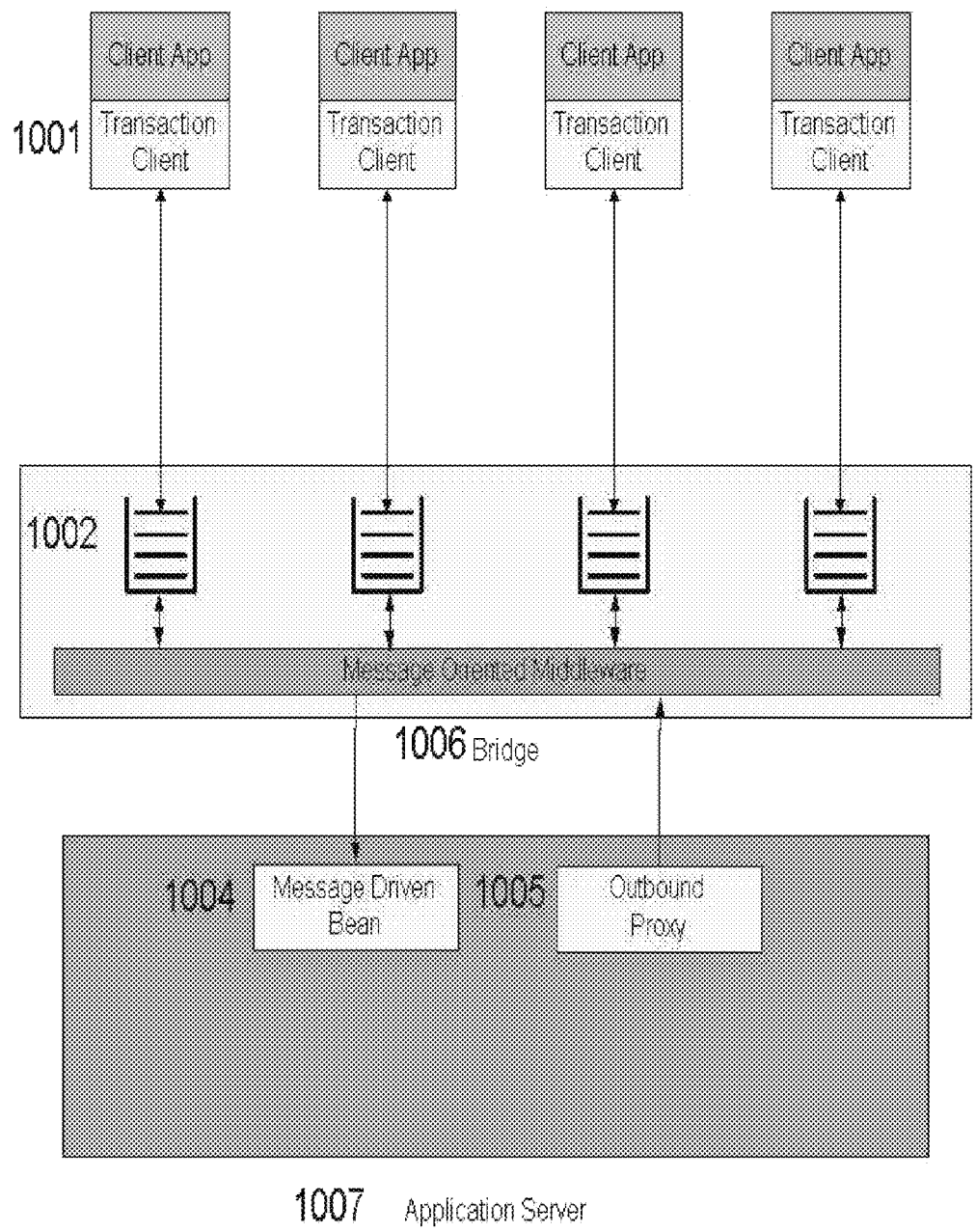
FIG. 10 shows the topology of a distributed transaction system using asynchronous messaging and the an application server (J2EE used here as an example).

In Mode 3 (Multiple Active Channels, Single Virtual Network), some vendors offer solutions that provide a single virtual network for multiple channels. There are no separate IP addresses. The channels can be combined transparently or are often exposed as separate directories at the system root. In this case, Channel Adapters can be developed for each Channel via the appropriate mechanism. The Message System will be able to automatically detect the existence of a Channel and send the messages to through the appropriate Channel In Mode 4 (Multiple Active Channels, Multiple Networks), it is straightforward to develop Channel Adapters for each Channel via the appropriate mechanism (eg. IP address). The Message Center 910 will be able to automatically detect the existence of a Channel and send the messages to through the appropriate Channel 2. Guaranteed Transactional Messaging for Disconnected Mobile Client and Server with Automatic Retry and Rules-Driven Rollback The KonaWare framework achieves bi-directional transactional reliability between a mobile devices and server applications by:
Implementing Guaranteed Messaging between the device and the Kona Bridge
Establishing transactional (OSI XA) semantics between the Kona Bridge and server applications
Providing a Rules Engine that handles exceptions when transactions fail to complete Referring to FIG. 10, each device 1001 consists of a client application and transaction client that implements Guaranteed Messaging to a corresponding User and Application Queues 1002 on the Kona Bridge 1006. Messages are kept persistently on a Message-Oriented Middleware 1003. A transactional envelope is opened and messages transferred to server applications through a Message Driven Bean 1004. If this operation is successfully committed to the server application, the transactional envelope is closed and the message is removed from the persistent queue 1002. Replies or server-initiated push messages are sent via an Outbound Proxy 1005 to a particular User Queue 1002. The Outbound Proxy has the same transactional logic as the Message Driven Bean but acts in reverse in that it listens for messages from the enterprise applications and then posts them to the outbound User Queue. All messages are logged in the Audit Queue and this ensures that none are lost. In the KonaWare implementation, a J2EE Application Server 1007 is used to host the Message Driven Bean 1004. On other platforms that use Web Services or equivalent transactional services (eg. Microsoft MTS, BEA Tuxedo), the Message Driven Bean might be a Web Service running inside a Web Service Client.

The KonaWare Bridge 1006 supports guaranteed transactions against the backend server. This has been achieved through an innovative application of message oriented middle ware and XA transactions. KonaWare has approached the problem of creating a reliable channel for wireless devices the same way financial intuitions approach the problem of creating a reliable backbone for handling financial transactions. It is not acceptable to lose a financial event, even if it results in an error during processing. The event must be preserved and if it is not successfully processed by the system it must be sent to an administrator for review and final disposition.

KonaWare supports this transactional infrastructure through three main aspects of the architecture. The first module involves supporting a message-oriented middleware (MOM) between the device and the server. The Kona Bridge, through the use of persistence, data marshalling, and device server communication, allows the device to reliably communicate with a MOM on the server. The next module involves an envelope to protect the business logic to processing the messages on the server side with an XA transaction. If the server does not properly dispatch the message it is always preserved on the MOM by rolling back the transactional envelope. Finally, an audit trail is kept of every incoming and outgoing message processed by the server. By creating an audit trail at the message level it becomes very easy to see the cause and effect of the messages on the server. Also, any messages that cannot be processed by the server are preserved on a backout or dead message queue for later processing by the Rules Engine or consideration and dispatching by the administrator.

Most of the current solutions in the industry have started by tying to extend an existing thin client solution to the wireless device. Convoluted and fragile schemes are devised to try to guarantee request/response sequences over tenuous wireless connections. Very often they are not able to recover messages when the servers crash. Also, they tend to log information at a very fine-grained level. Either creating huge server logs that have to be parsed and archived into a data warehouse for analysis or change logs on large databases where one simple request could have resulted in dozens of database columns being updated. It is very difficult to determine cause and effect with these types of archives.

Figure 11:
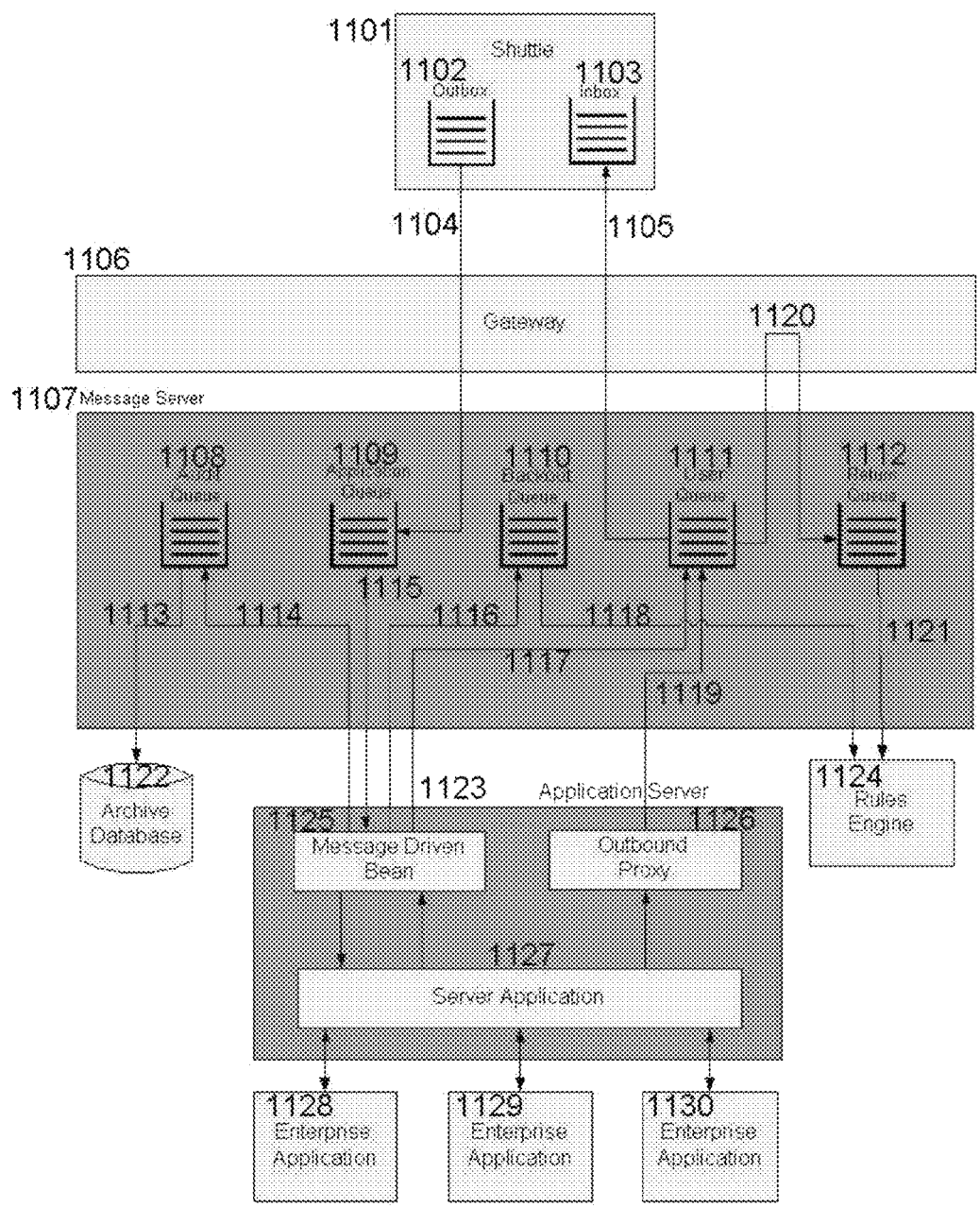
FIG. 11 shows the components and sequence of steps for providing transaction guarantees in an intermittent network.

FIG. 11 provides a detailed diagram of the transaction system for a single Device.

The Device has a software library called the Shuttle 1101 that implements asynchronous messaging. It talks to the server via standard protocols such as http/s and sockets. The library uses a local database to store messages that are to be sent to the server. These messages are removed only after the server has acknowledged receipt, thus ensuring that no message will be lost.

The KonaWare Bridge consists of three main components:

The Gateway
The Message Server
The Transaction Monitor

The Gateway 1106 is an application that translates the JMS queue messages from the Message Server to the JMS client protocol (http/s or sockets). It also handles security (authentication, encryption), compression, etc.

The Message Server 1107 is an application that uses a JMS-compliant Message Oriented Middleware (MOM), eg. IBM MQseries, TIBCO. It creates the following messaging queues:

User Queues 1111. A User Queue is created for each User-Device pair. This queue holds messages sent from the Server to a particular User-Device target.

Application Queues 1109. Each application on the Application Server will have a Queue. This queue holds messages from the devices to that particular application.

Audit Queue 1108. There is one Audit Queue created for each instance of the Bridge. It is used to hold all successfully processed messages to the applications and devices.

Backout Queue 1110. The Backout Queue is used for processing exceptions and holds messages that could not be sent from the Device to the Server application.

Return Queue 1112. The Return Queue is used for processing exceptions and holds the messages that could not be sent from the Server application to the Device.

The Transaction Monitor implements the XA standards for ensuring that a transaction is complete. In the KonaWare framework, the Transaction Monitor is implemented in the Message Driven Bean 1125 running inside a J2EE Application Server 1123. J2EE Application Servers provide transactional guarantees among its Beans. If implemented in a different container or protocol such as Web Services, then the equivalent transactional guarantee must be provided by the container or implemented by the developer. When a message hits the Application Queue 1109 that the Message Driven Bean 1125 is listening to, the onMessage( ) method is invoked. A sample implementation of this method that provides transactional guarantee is shown in Appendix A. Note the BEGIN TRANSACTION and END TRANSACTION sections that bracket the transaction boundary.

The Rules Engine 1124 is a daemon that listens to the various exception queues (Backout, Return). It acts upon each message on these exception queues based on the rules provided by the administrator. The rules engine parameters include:

Retry frequency
Maximum retries
Failure action
Etc.

The Audit Trail Daemon listens for messages that have been completed and stores them into the Archive Database 1122. It can provide reports or archive services.

Now let's trace through a transaction and see how it works. First, a message is sent through the Shuttle 1101 to the server. The Shuttle places the message in its Outbox 1102, which is a queue. When there is connectivity to the server, the Shuttle pulls the message from the Outbox, assigns a Global Unique Identifier (GUID) to the message and sends it 1104 to the target Application Queue 1109 through the Gateway 1106. The Shuttle and Gateway implement a guaranteed messaging protocol through a series of acknowledgements. If the Gateway successfully receives the whole message (using integrity checksums), it sends an acknowledgement to the Shuttle; upon which the Shuttle will delete the message from its Outbox. If the connection is broken while the message was en route, the Shuttle will not receive an acknowledgement from the Gateway and automatically retry later. However, if the message is received, but the connection is lost while the acknowledgement is being sent, then the Shuttle will ask the Gateway the last message it received and know that it was successfully received; then it will delete the successfully sent message and attempt to send the next message in the queue. Instead of automatically retrying each time but only exchanging the GUID's of the messages, bandwidth is conserved. This sequence will guarantee that the message is sent from the Shuttle to the Gateway. Once this has been accomplished, the Shuttle does not have to hold on to the connection but can "hang up" until a response is waiting for it.

The message now sits in the Application Queue 1109, awaiting the Message Driven Bean 1125 to process it. The Message Driven Bean pulls the message 1115 from the Application Queue to which it is listening. This message is considered a Request and is assigned a correlation ID. The Message Driven Bean invokes the appropriate application logic in the Server Application 1127 to which it has been bound. A this point, it opens the BEGIN TRANSACTION section of the transactional envelope. The Server Application in turn interfaces with external Enterprise Applications 1128, 1129, 1130 or Databases. If the transaction is a straightforward WRITE operation (eg. sending new information to a customer record), then the transaction is complete. The Message Driven Bean closes the transaction with the END TRANSACTION section and deletes the message from the Application Queue.

If the transaction generates a Reply to the Response, then the Server Application sends the data to the Message Driven Bean which wraps it in a Reply Message using the sender's correlation ID and sends it 1117 to the appropriate User Queue 1111. When there is a connection between the Shuttle and the Gateway, the Shuttle will pull the Response message from its User Queue 1111 and place it in the Inbox 1103. The client application will be able to match the response to the original sending message by using the correlation ID. The Shuttle and Gateway use the same guaranteed messaging protocol to retrieve messages as they use to send messages (described earlier). In both cases whether there is a response or not, the message is sent to 1114 the Audit Queue 1108. The administrator can then examine the Audit Queue at any time to track the transactions. The KonaWare system flushes the Audit Queue once a thy and stores the messages 1113 in an Archive Database 1122. This allows the administrator to run reports against the database.

If the transaction fails due to any reason, then it has to rollback the transaction to ensure that the entire system is in a consistent state. Failure could occur for a number of reasons. For example, one or more of the Enterprise Applications 1128, 1129, 1130 could be unavailable. In this case, the transaction must be rolled back. If the network to one of these systems is unavailable, the transaction must also be rolled back. A rollback is accomplished by the Message Driven Bean detecting that a failure has occurred between the BEGIN TRANSACTION and END TRANSACTION block and executes an exception handling routine, which sends the message 1115 to the Backout Queue 1110. Note that the Message Driven Bean must be careful to ensure that the message has been successfully placed in the Backout Queue before it deletes it from the Application Queue or it might be lost during a system outage. The reason why it is important to remove the message from the Application Queue is because the Message Driven Bean would automatically get the next message and try to process it. If the failed message were left on the queue in an attempt to retry the transaction and the retry failed again, then the process would repeat itself ad infinitum, thus causing the system to go into an infinite loop. This type of message is called a poison message. It has to be immediately moved out of the normal processing queue.

The Rules Engine 1124 listens for messages in the Backout Queue 1110. It pulls the message to examine the contents and can take various exception handling actions. It could send an exception back to the originating client application by creating an exception message and sending it to the Shuttle. It could send an email to the administrator to manually handle the exception. For instance, the problem might be an enterprise application that is currently down, so the administrator can bring the enterprise application up and then replay the messages by putting them back on the Application Queue 1109. The KonaWare Rules Engine provides a Java Interface where a developer could create custom exception handling routines. For example, assuming an enterprise application was recently upgraded and expected a different message format than the one being sent by the current Shuttle, any other system would fail and not have any recourse. However, with the Rules Engine, the developer can write an exception handling routine that examines the target enterprise application and knowing that it expects a different format, automatically reformat the message and place it back on the Application Queue. This is useful when there is a delay in the time that client applications are updated since mobile users will not upgrade their applications all at the same time. Obviously, this should only be used for exceptions and not as a regular method for dynamically formatting messages because it is inefficient.

In the case where the server initiates the message (also known as server initiated push) such as an alert from an Enterprise Application that must be sent to a User, the Server Application invokes the Outbound Proxy 1126 to create a message and place it in the User Queue 1111 for the target user. The corollary to the failure case described above for Request messages from the Shuttle is also performed here. When the message on the User Queue fails to be sent due to various reasons (eg. Shuttle is unavailable after a timeout, or Shuttle rejects the message), the Gateway determines if it should be an exception and places it on the Return Queue 1112. The Rules Engine also pulls these messages from the Return Queue 1112 and takes the same similar actions to those described for the Response message failure case.

3. Conflict-Free Mobile Data Synchronization with Enterprise Applications

KonaWare has designed an innovative combination of messaging and database synchronization in order to support our unique Device/Server architecture for extending enterprise server applications to wireless or occasionally connected devices. This combination results in device applications that can be run in a disconnected mode and can be synchronized with the server at any time. The synchronization process involves business logic being defined at the server side to handle any changes and/or conflicts coming from the devices. Any exceptions or conflicts can be handled directly in the business logic code process the message request or it can be moved of to a Rules Engine for later processing. Possible resolution strategies include returning the request to the device, retrying the request on the server, or editing the request and retrying it on the server. Filters used to create subscriptions for each user on each device and consistent, server-centric data is sent back to the devices keeping them up to date and completing any request that they have originated.

Current solutions for disconnected device/server support in the industry involve two main approaches. The first is to replicate the server on the device. The device application then works directly on the local server running on the device. At some point later the local server can be synchronized with the central server. This results in a large client side library to run the server and, in effect, the maintenance of hundreds of servers that have to be synchronized and maintained. The second approach is to have the device application work against a database that can be synchronized to a server based hub database. The problem with this solution is conflict management is difficult to support and very often the business logic associated with processing the updates does not exist at the database level and would be very difficult to integrate.

Figure 12:
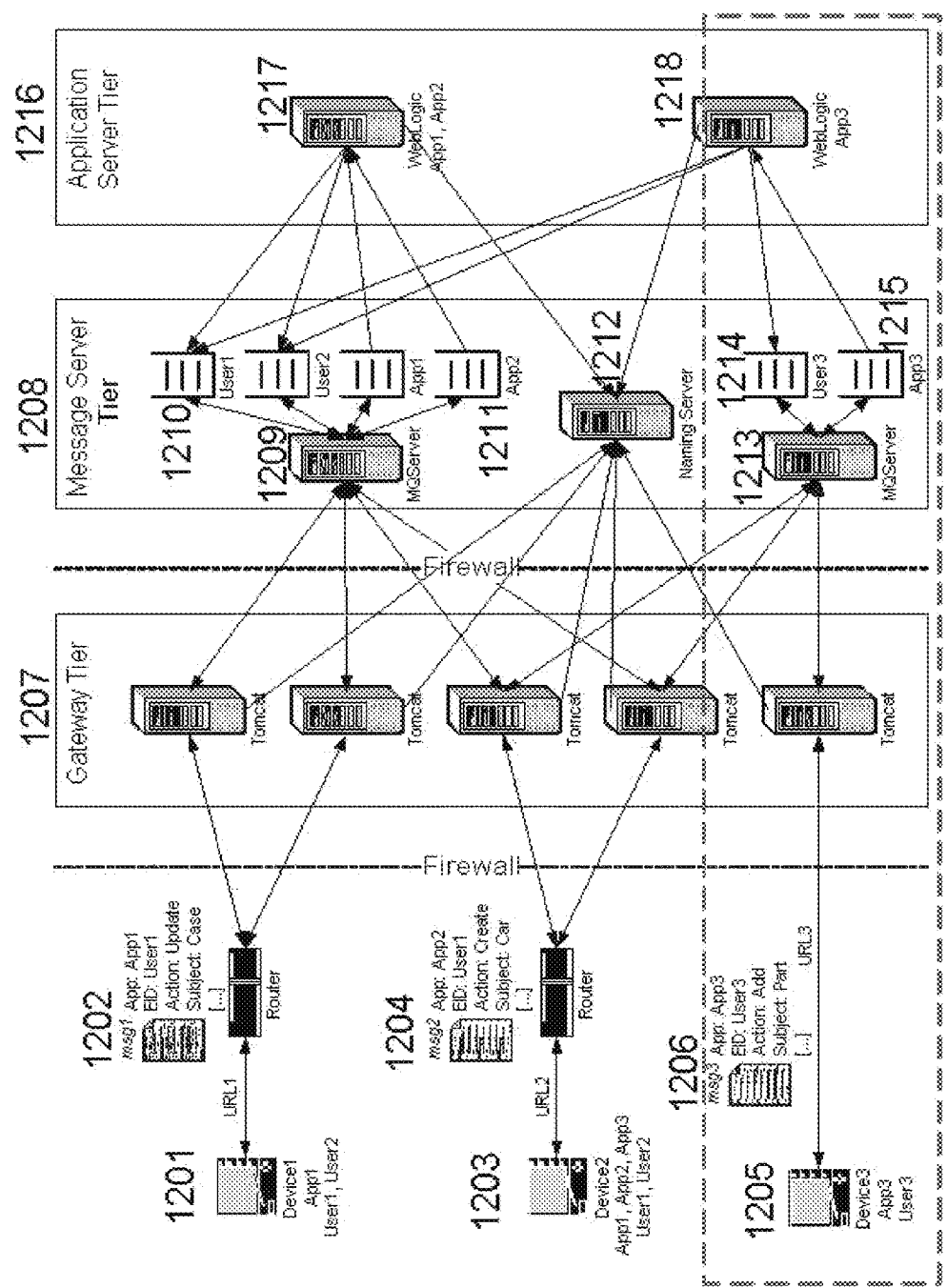
FIG. 12 shows the topology of the KonaWare system with message details.
Figure 25:
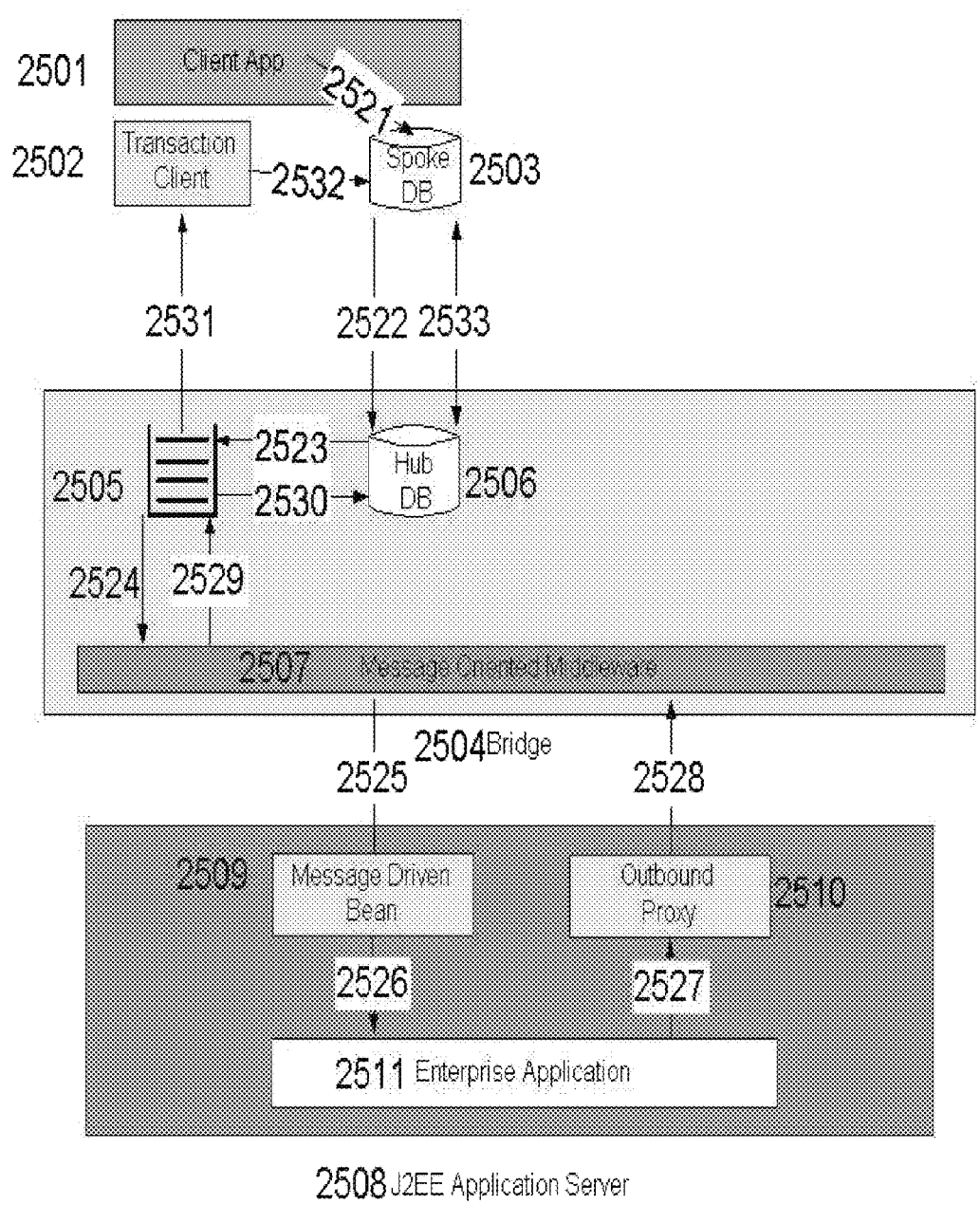
FIG. 25 shows how asynchronous messaging and database synchronization are combined to provide database synchronization without synchronization conflicts.

The Kona Bridge actually consists of several tiers of servers used to support transactional messaging and database syncing between the device and the J2EE server application running on the Application Server. The diagram in FIG. 12 shows a breakdown of the Kona Bridge components. FIG. 25 shows the detailed sequence.

Starting with the device, each application will contain one URL for message traffic (and later one URL for database sync traffic). A foundry switch, proxy or router can be use to logically map that URL to a group of Gateway Servers. The device application will create a message object and then create a connection to a Gateway Server using its MESSAGE-URL.

Once this is done, the request goes to the MJMS Gateway Servlet to get the message over to the proper message queue. This Servlet should connect with the Naming Server to lookup the proper JMS Connection to a Message Server and Queue for delivery. The Servlet will then connect to the Message Server and deliver the message to the proper queue. It will then reply to the device application that the message is delivered and the device can release the local copy.

The Application Server will contain several Message-Driven Beans (MDB) that will monitor each of the queue associated with the applications that are deployed on the server. The Naming Server will again host the information used by the MDB to determine which Message Server to connect to and the location of the queues.

After processing the message, any replies will be sent to the users queue. Right now, we are planning on only having one queue per user. This means that queue can contain replies from several different applications. If the User is working on two different applications concurrently using two different devices, this means that the User's queue can potentially contain messages from two different applications at one time.

Once the message is in the User's queue, the next request from the device to check the queue will result in a hit. Keep in mind; the Gateway Server that processes the request for messages needs to know the name of the application that is making the request so it can setup the proper Message Selector on the User's queue. This will allow it to only pull messages off the queue that are associated with the given application. It is too costly for the Gateway Server to pull messages off the queue and check them to see if they match. A Message Selector should be used.

After the message is recovered from the queue it is sent to the device application. Depending on how the onMessage method is written in the device application, this could result in a new record being created on the device, on a record being updated (status goes from 'pending_sent' to 'stable') or a notification dialog is popped up.

All messages should be persisted until it can be determined they have been delivered safely.

There are three types of asynchronous models:

1. Fire & Forget—This is where the device just sends a message and doesn't care how it's resolved on the server. Probably not that useful overall, however, will probably be available using low level messaging.

2. LUCID—As described in the CloudSync manuals, LUCID stands for Logic Up—Consistent Information Down. This means that the data sent up from the device to the server is handled through business logic. The data sent down from the server to the device is a consistent picture of the data on the server, the device shouldn't have to process this information using any application logic.

3. Lightweight LUCID—This is the same as LUCID going up—data is processed using business logic, however, there isn't necessarily a requirement for the consistent server image to be sent back to the device. The server can just send an 'ack' to indicate the data was received and process or a 'fault' to indicate any problems. This is the model that we will initially use for the libraries.

Messages will be used to carry requests, reply and data record information between the device and the server. They can be initiated either on the device or on the server. This section will cover the format details of the message and some information on how the message is processed.

It will have to be decided which module of the Bridge is responsible for setting each of the keys in the message. Just thinking out loud, the application will have to set the object related keys and values with the body of the message. The MessageCenter should probably set any required or configurable JMS Header details. Either the MessageCenter or the application code can set the Header Keys within the body.

Using JMS parlance, we will be using MapMessage to transfer our data. May also use TextMessage to transfer status or command messages. The message will consist of a:

JMS Header—Describes the routing, timestamp, priority and agents involved with the message.

Body—Contains the details of the message. Either the command to be executed or the object to be passed.

Refer to JMS (Sun Microsystems) for standard JMS Header information. Includes JMSPriority, JMSTimeToLive, JMSMessageID, and JMSCorrelationID.

The Body will contain some required keys that act as an internal header and various forms of content associated with the message.

Required Header Keys kw.mid—This will contain the internal MessageID generated within the MJMS modules. It will be the primary correlation ID used between the device and the gateway MJMS libraries.

kw.act—This will contain the action associated with the message. Actions are a collection of reserved words that are broken up into three fields. The first field will indicate which side of MJMS initiated the original message associated with this message. The second field will indicate the type of action to perform. The third field is optional and will be used in the case of reply messages to indicate what type of reply is contained in the message.

The kw.act will be formatted as follows:

<point_of_origin>_<type_of_action>_<type_of_response>
point_of_origin: ['d'||'s'] will be 'd' if device initiated or 's' if server initiated.
type_of_action:
['request'||'create'||'read'||'update'||'delete']
type_of_response: ['ack'||'response'||'fault']

kw.obj—This contains a reference to the type of business object that is associated with the message.

kw.uid—This is the User ID of the user using the device application. In the case of messages originating on the device it indicates which user is sending the message. For messages originating on the server, it indicates which user should receive the message.

kw.aid—This is the Application ID of the application being run on the device and on the server. Both sides should be using the same ID. This is used by the Gateway to create a Message Selector to only pull those messages from the user's queue associated with each of the applications that user may be running kw.did—This is the Device ID of the device hosting the application. This will only be used on messages originating from the device or sent in response to requests from the device. The server will mainly be focused on sending data to a user associated with an application and doesn't care which device is used to run the application.

The rest of the body will consist of a series of (key, value) pairs that will describe objects data or parameters to server side business logic. This will be application specific. See Example section for more details.

msg.num—Used to indicate the sequence of a message. In most cases this will just be one, however, when there are many messages associated with a reply, this will indicate the sequence of those messages.

msg.islast—Either 'true' or 'false'. Used to indicate the last message in the sequence.

We have talked about a policy where we will allow the User to create and update records on the device but they will always be considered 'pending' until they are confirmed on the server application. The User is free to update this 'pending' record until it is in the process of being sent or synced with the Bridge. At that point its status is changed to 'pending_sent' and the user will not be able edit the record until a matching response is received from the server. At that point the local record status needs to be updated to 'stable' or 'in_error' depending on the results.

Also, whenever new records are created on the device, they will need a locally unique id so the device application and the GUI can manage them. The User should be allowed to work with these new records and update them as long as they are not being currently synced with the server application.

In some cases the primary key of the record can be generated on the client if it's a name associated with a unique session or context on the application. In the other cases the primary key must be auto generated on the server application. In these cases the records will need two keys, one that can be used by the device application before the server assigns the real key and the primary key used by the server application.

This leaves us with the requirement that every record (model object) stored on the device application will possibly need the following additional attributes while on the device:

KW_ObjID—the locally unique ID for the object created by the device application.

KW_Status—current status of the object. Should be one of the following:

STABLE—The record has been read or returned from the server application.

IN_ERROR—The record has been returned from the server application with a problem. Need to use the KW_ErrorMsg token to look up the error message.

PENDING_CREATE—The record has been newly created on the device application but not synced with the server application.

PENDING_DELETE—The record has been deleted on the device application but not synced with the server application.

PENDING_SENT—The record was in some previous PENDING state and has now been sent off to the server application to be synced. Upon receiving a reply from the server it will be marked as STABLE or IN_ERROR. The device application cannot change a record in this state in any way.

PENDING_UPDATE—The record has been updated on the device application but not synced with the server application.

KW_Fault—If the record has KW_Status=IN_ERROR this will contain a token that can be used to look up the error message.

KW_MsgID—When a record is being sent over to the server this field is used to store the Message ID of that message. This will be used by the application when the reply or fault is returned in response to the message.

KW_TimeStamp—When a record has been sent over to the server this field is used to store a time stamp of when that message was sent. This can be used by the application to determine when there may be a problem on the server side and to retry or resend a message.

We should remember to show the User if there are any 'pending' records on the device application. This will help reduce conflict. If they know that the device still has pending records associated with their use of the application they should not be surprised when they create a conflict situation by operating on the same records using another device.

All conflict and fault resolution will have to be handled by server-side application logic. Conflict occurs when record changes made on the devices collide on the server. They can be classified in the following manner INSERT_INSERT—two devices inserted the same row, but with different values DELETE_UPDATE—one device deleted the row, while the other updated it UPDATE_DELETE—one device updated the row, while the other deleted it UPDATE_UPDATE—both devices updated the same row Faults can occur for various reasons like constraint violation, invalid records, server side failure and environmental issues like running out of memory.

In both cases they are detected, classified and handled by the server. When the server receives a message that results in a conflict or fault it will have several options in how it can handle conflict.

1. It can be retried (AKA Retry). Not normally a good solution but in some cases were there are dependencies between messages this may be enough to fix the problem.
2. It can return the message to the device (AKA Return To Sender). In the case where the message contained an invalid record it probably will have to go back to the device to be resolved.
3. It can be modified by the server application and retried (AKA Edit and Retry). If the conflict, exception or fault is known to the server application and possible causes and solutions have been programmed, they can be tried. Careful notes must be logged of any changes to the message that might alter the meaning and a separate entry should be made into the Audit Queue when this is attempted.
4. It can be moved to the Backout Queue. From there the Rules Engine logic will handle the situation or an Administrator will be notified to look at the message in the Backout Queue. In this case, the device will have the associated record locked so the server application will have to decide if the device will be notified that the message has caused a problem and may not be processed right away.

The following are requirements for the Security Modules:
1. The User will have to login to the application and will be locally authenticated using the local account information. This means the User account information including the User ID and encrypted password needs to be located on the device.
2. The request from the device application will create a http/https connection to the Gateway Server using the certificate issued to the application. This means the Gateway Server that receives the connection must trust the given certificate.

Figure 13:
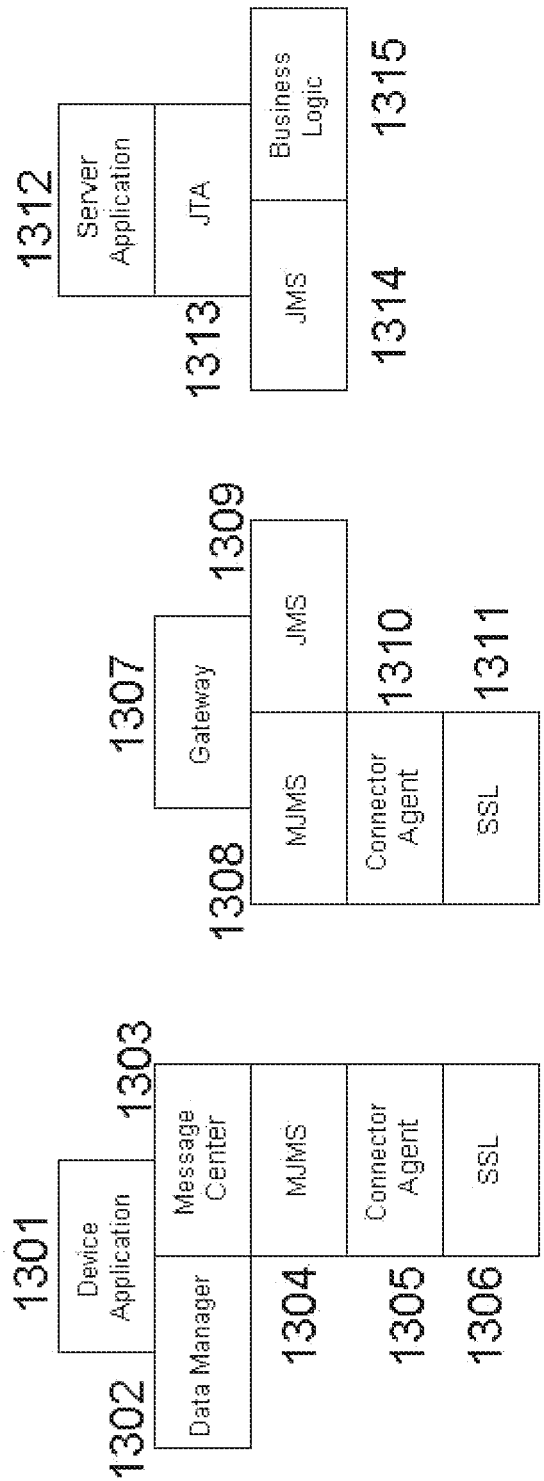
FIG. 13(a) shows a design for device libraries.
FIG. 13(b) shows a design for gateway libraries.
FIG. 13(c) shows a design for server libraries.

A possible module design for the Device libraries would look like FIG. 13(a). The responsibility of each of these modules is outlined below.

Device Application Layer:
Collects data from the user.
Manages the storage of data on the device using the Data Manager API
Manages the status of all records on the device and observes rules with respect to PENDING_SENT status.
Manages the initiation of messages to the server using the Message Center.
Implements a MessageListener to handle all messages from the server including replies to previous requests.
Manages the date/time standard related to all time stamps.
Can manage the objects using Value Object or HashTable or some other form of encapsulation.
Manages a "Local Queue Icon" that is always displayed to the User to indicate how many messages are currently still queued up on the local queue. This indicates to the user that there are messages that need to be sent to the server and he should move into coverage or connect the device to the network before shutting off for the day.

Data Manager:
API to simplify the persisting and management of object data to different types of database solutions. Initial solution will use PointBase Micro.

May share the responsibility of the application to maintain the extra KW_XXX fields associated with each object on the device.

Should interact with the Application Layer using whatever encapsulated form it uses for object data (i.e. HashTable)

Message Center:

API to simplify the JMS operations associated with send requests and applications objects out as messages.

Should interact with the Application Layer using whatever encapsulated form it uses for object data (i.e. HashTable)

Uses the MJMS layer to send the message.

Shares responsibility with the Application Layer to manage several parameters of the message like Priority and TimeToLive.

Returns a MessageID unique to the device associated with each message that is sent.

MJMS:

Implementation of the asynchronous messaging interfaces that are needed on the device.

Manages the local queue on the device. This needs to be persisted and protected in the event that the application is shut down before the messages are sent. Should also be protected in the case of a fault.

Assigns unique Message ID to each message sent.

Uses the connection profile and Connection Agent to send the messages to the Gateway using the proper channel Constantly monitors the local queue and connection status to keep working on sending local messages and polling for incoming messages.

Passes incoming messages to the MessageListener in the Application Layer.

Connector Agent:

Supports the actual transmission of the message over the available channels to the Gateway.

Will have to have connection support for each type of connection we will support and monitor. Should initially include http.

SSL:

Used by the Connection Agent to encrypt data over the connections.

A possible module design for the gateway libraries would look like FIG. 13(b). The Gateway code is basically the main bridge between the MJMS requests coming from the device and the JMS Message Server hosting the queues. It takes messages from the devices and forwards them to the proper queues in the JMS Message Server. It also monitors queues on the JMS Message Server for messages that are to be sent to the devices and will forward them when connections are established.

The Connection Agent and SSL modules are basically complementary server side code to the same libraries on the device. They support the device connecting to the gateway and transmitting messages back and forth.

Message Selector—As discussed above, when a device application checks for messages with the Gateway Server, the User's queue may contain messages for several applications at the same time. The Gateway Server needs to know the name of the application that is making the request and then should filter the messages on the queue using a Message Selector so only those messages associated with the given application name will be read.

This can also perform some type of authentication of the device using a certificate.

A possible module design for the server libraries would look like FIG. 13(c). As discussed above the Server Application will contain all the message management and logic. It will basically read messages off its request queue and process them against the existing Business Logic.

There is another part that is not shown where the server side; Business Logic would initiate a message to the devices. This will be handled through a Proxy module connected to the Business Logic that, similar to the MessageCenter on the device, will simplify the transformation of the server side data into a message. It will then place the message on the proper queue. All messages originating from the server are expected to be consistent and should not cause a Fault on the device. Currently the device has no policy for handling bad messages from the server.

This section contains some possible sequence diagrams showing the interaction and responsibilities of some of the modules on the device.

Figure 14:
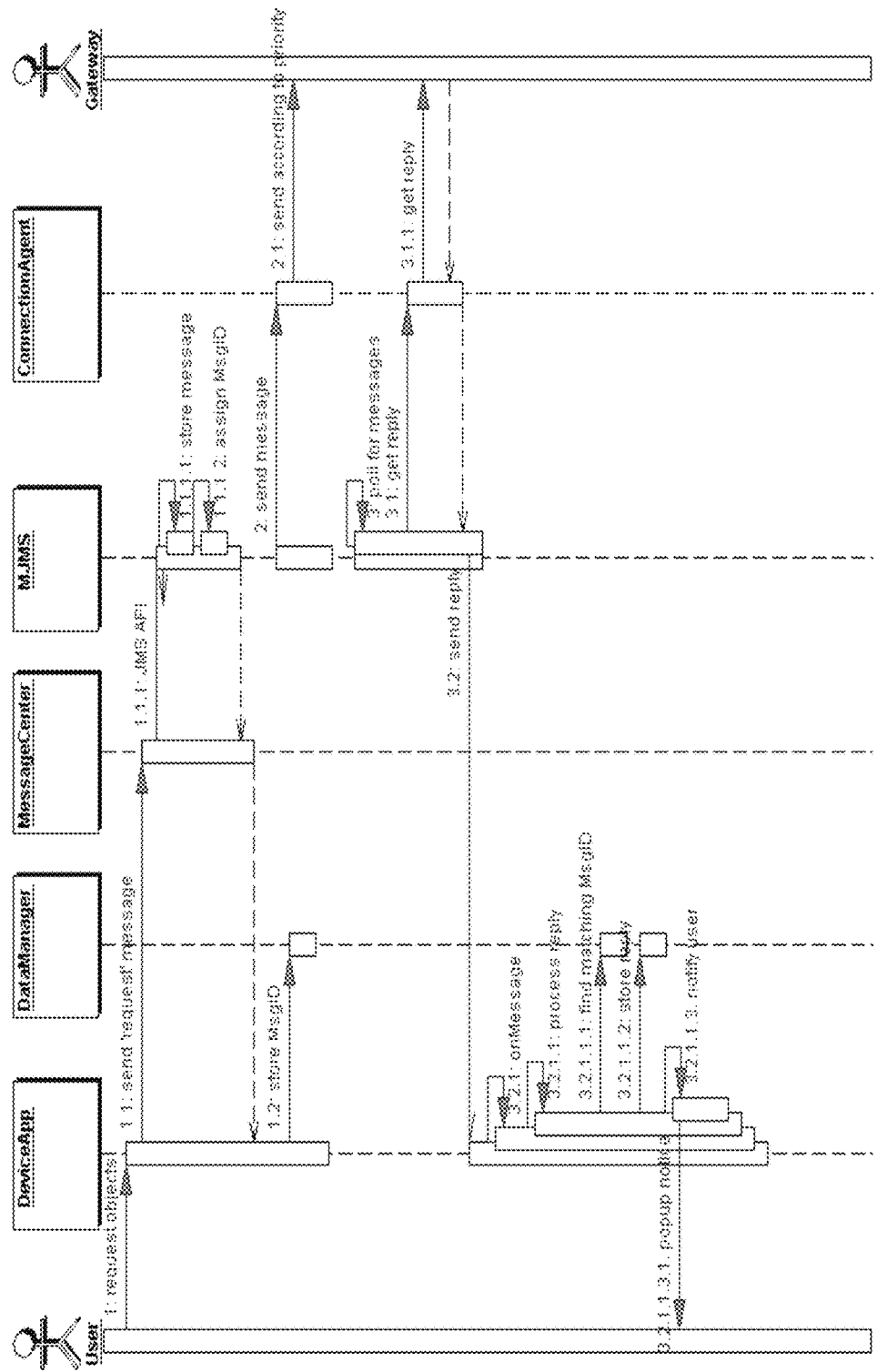
FIG. 14 shows the sequence diagram for a client creating an object.

FIG. 14 shows a sequence between modules on the device when the user creates a new record on the device and sends it to the server.

Figure 15:
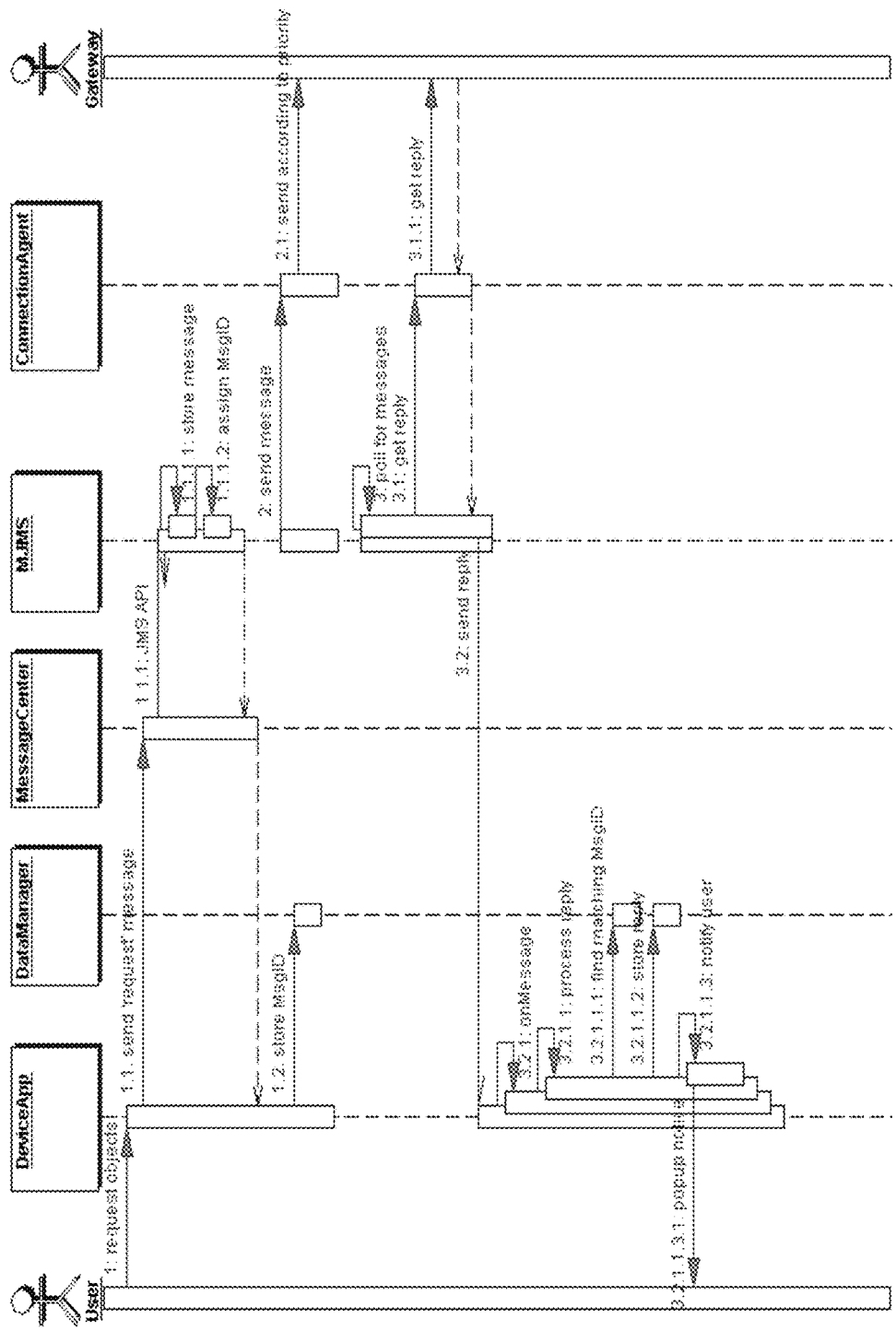
FIG. 15 shows the sequence diagram for a client requesting an object.

FIG. 15 shows a sequence involved between modules on the device when the user makes a request to the server for object records.

This will provide some high level context and some specific examples of message and records exchanges associated with an application. The example application will simply be remotely managing Widget records. A Widget has three data fields:

ObjID, INTEGER, PK Unique

Name, VARCHAR(20), NOT NULL

Type, VARCHAR(10), NOT NULL

Figure 16:
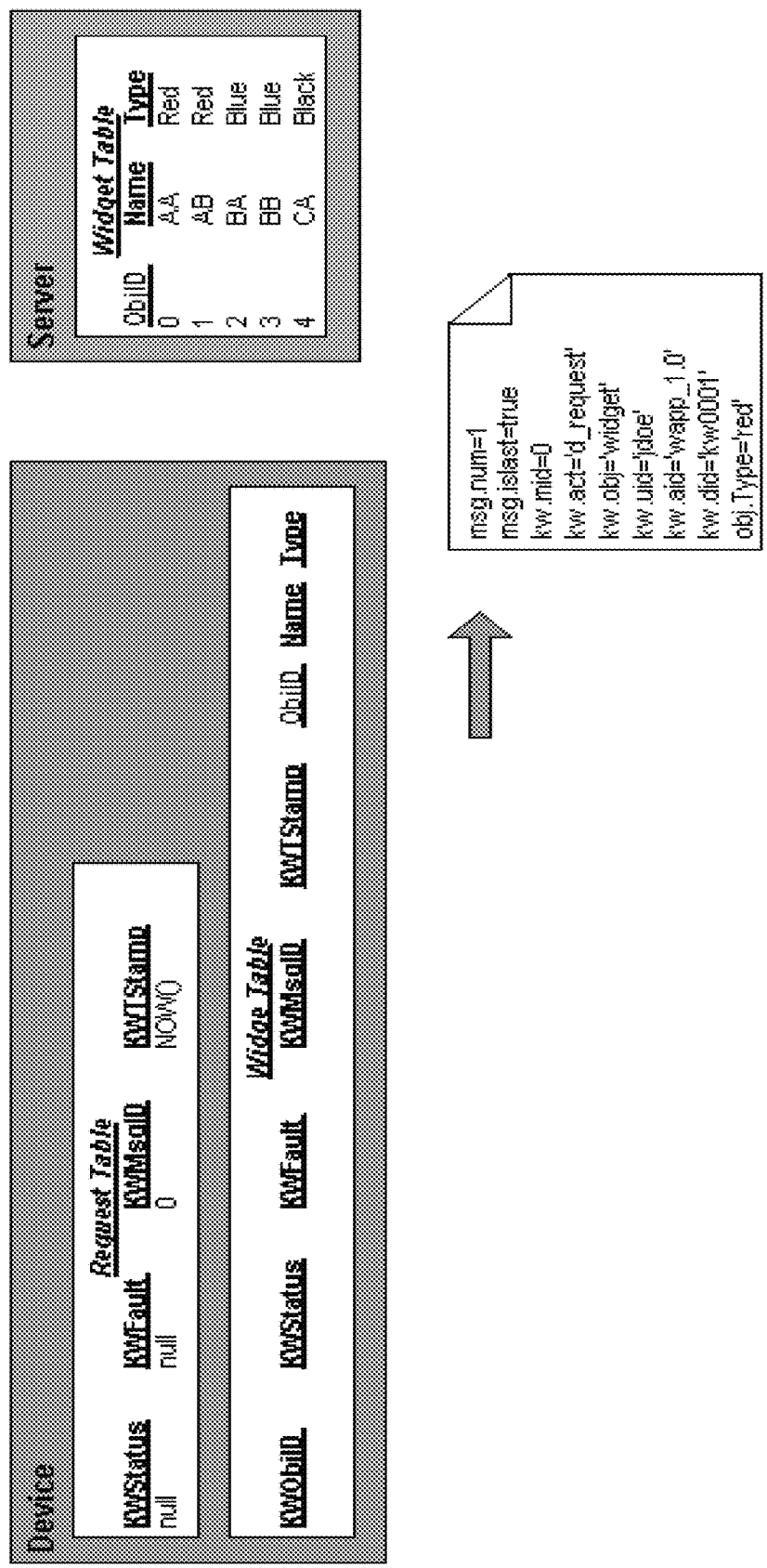
FIG. 16 is a state diagram from an example application involving message and record exchanges.

User 'jdoe' using application 'wapp_1.0' on device 'kw0001' hits the button to pull down all the Widgets from the server that are of Type 'red'. This sends a message to the server and stores a record in the Request Table on the device. State looks like FIG. 16.

Figure 17:
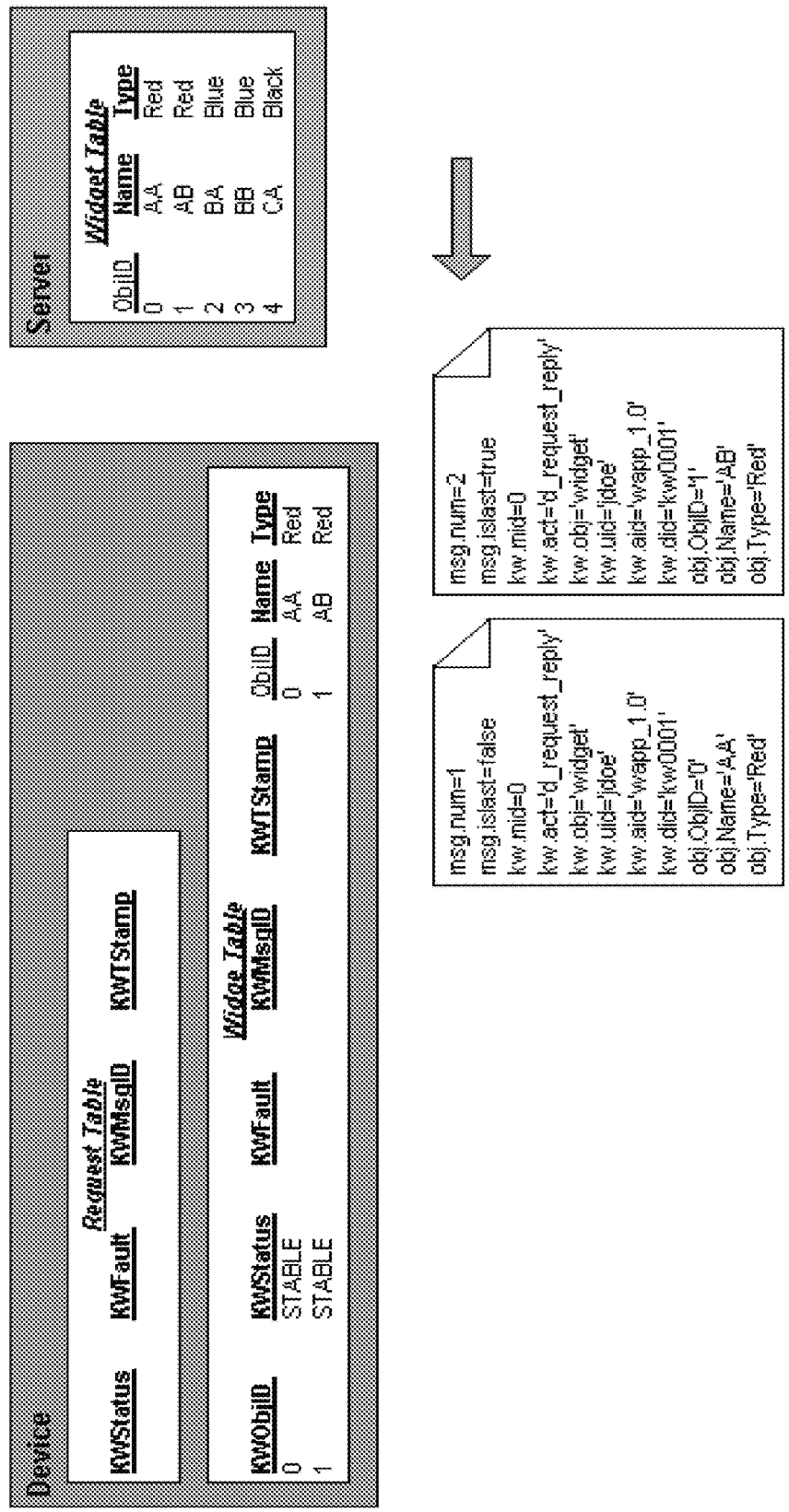
FIG. 17 is a state diagram from an example application involving message and record exchanges.

Server sends two reply messages back to the device with the two 'red' records. Device uses the 'kw.mid' and 'kw.act' to determine that these should be stored in the Widget table. State looks like FIG. 17.

Figure 18:
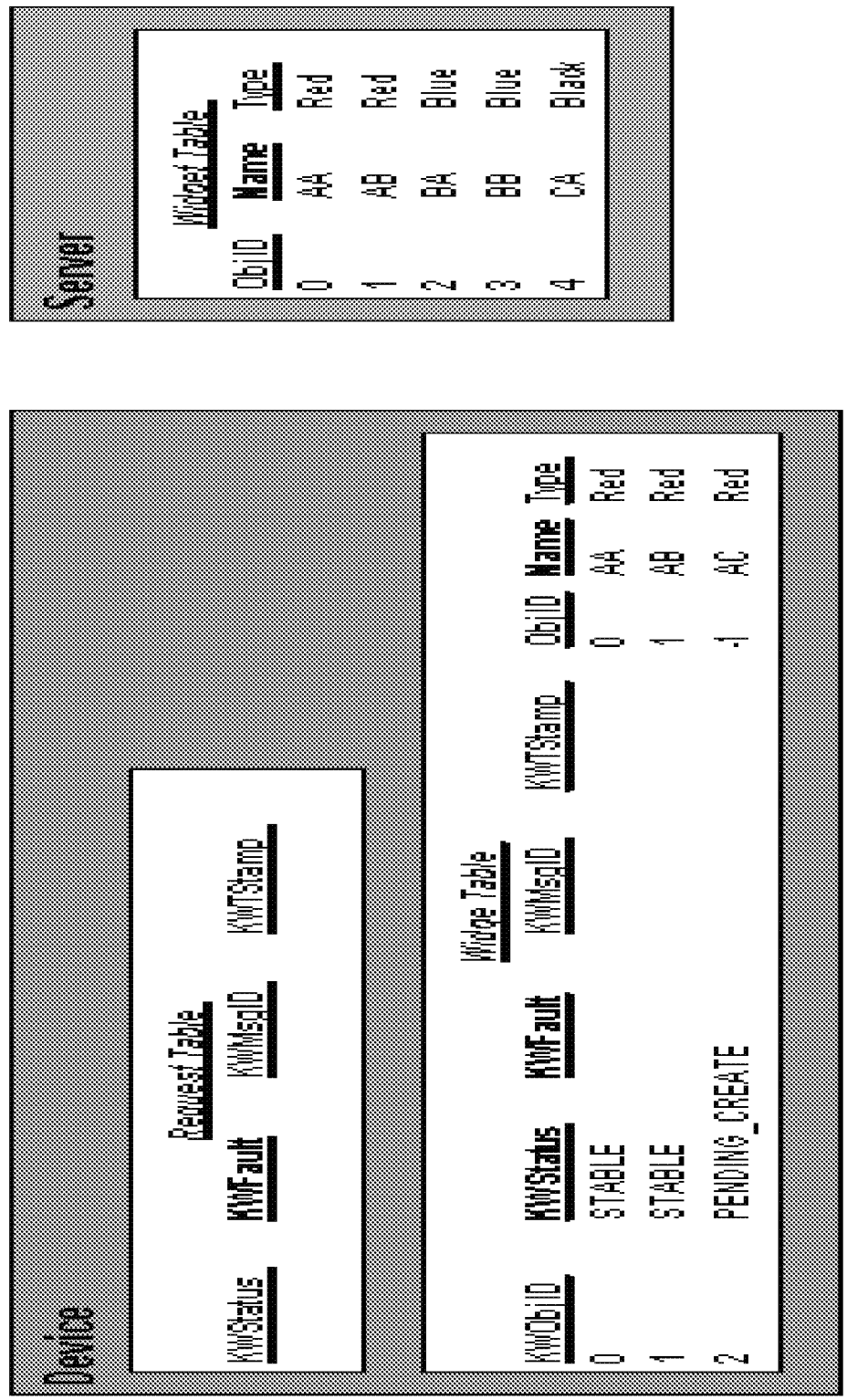
FIG. 18 is a state diagram from an example application involving message and record exchanges.

The user on the device then creates a new Widget and inserts it into the Data Manager. State looks like FIG. 18.

Figure 19:
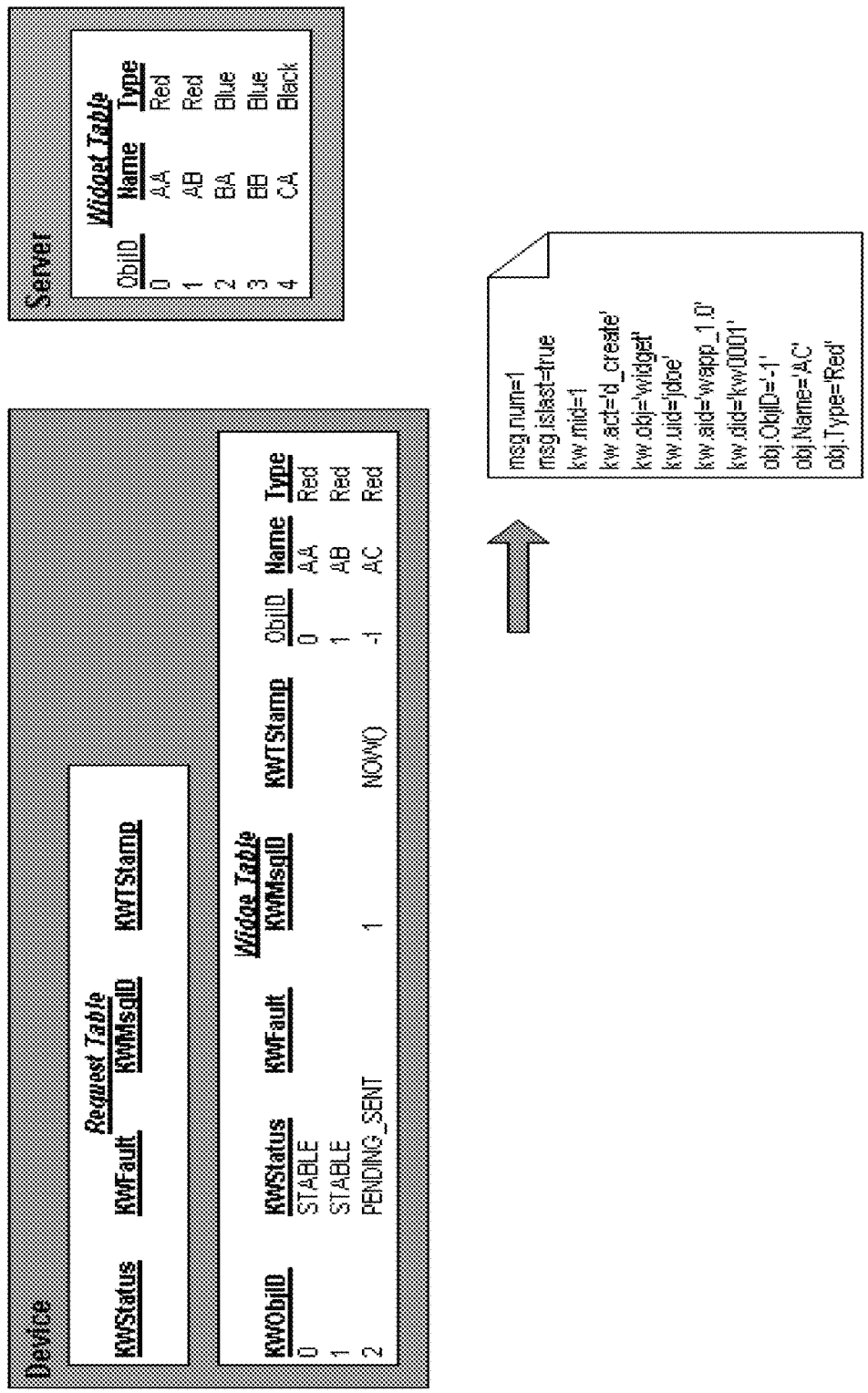
FIG. 19 is a state diagram from an example application involving message and record exchanges.

Depending on the mode of the Device Application (can cache changes and then send all at once or send them as they happen) an instant later a message is sent to the server. State looks like FIG. 19.

Figure 20:
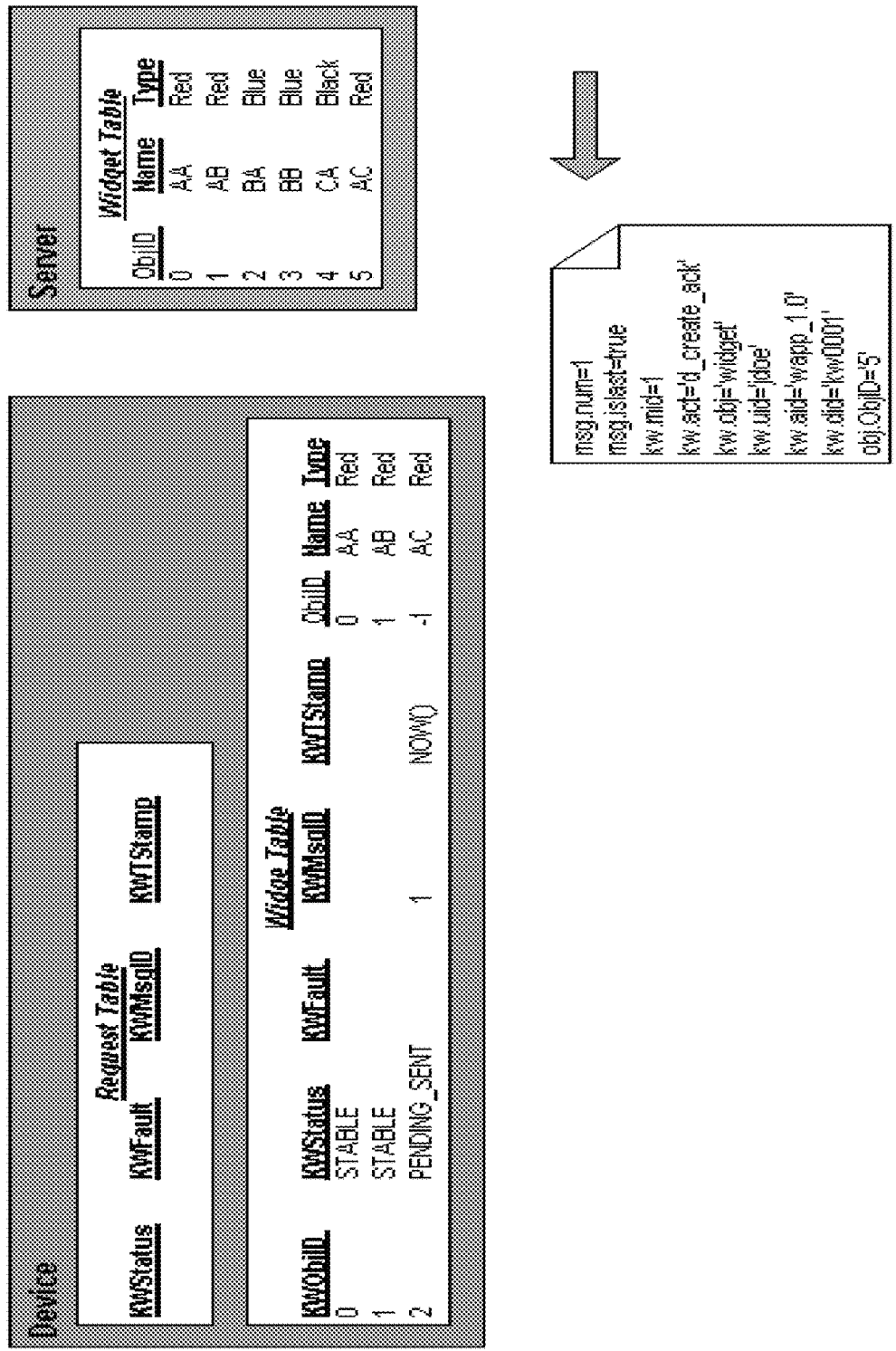
FIG. 20 is a state diagram from an example application involving message and record exchanges.

The server accepts the message, updates its state and then sends a 'ack' back to the device so it can stabilize its records. State looks like FIG. 20.

Figure 21:
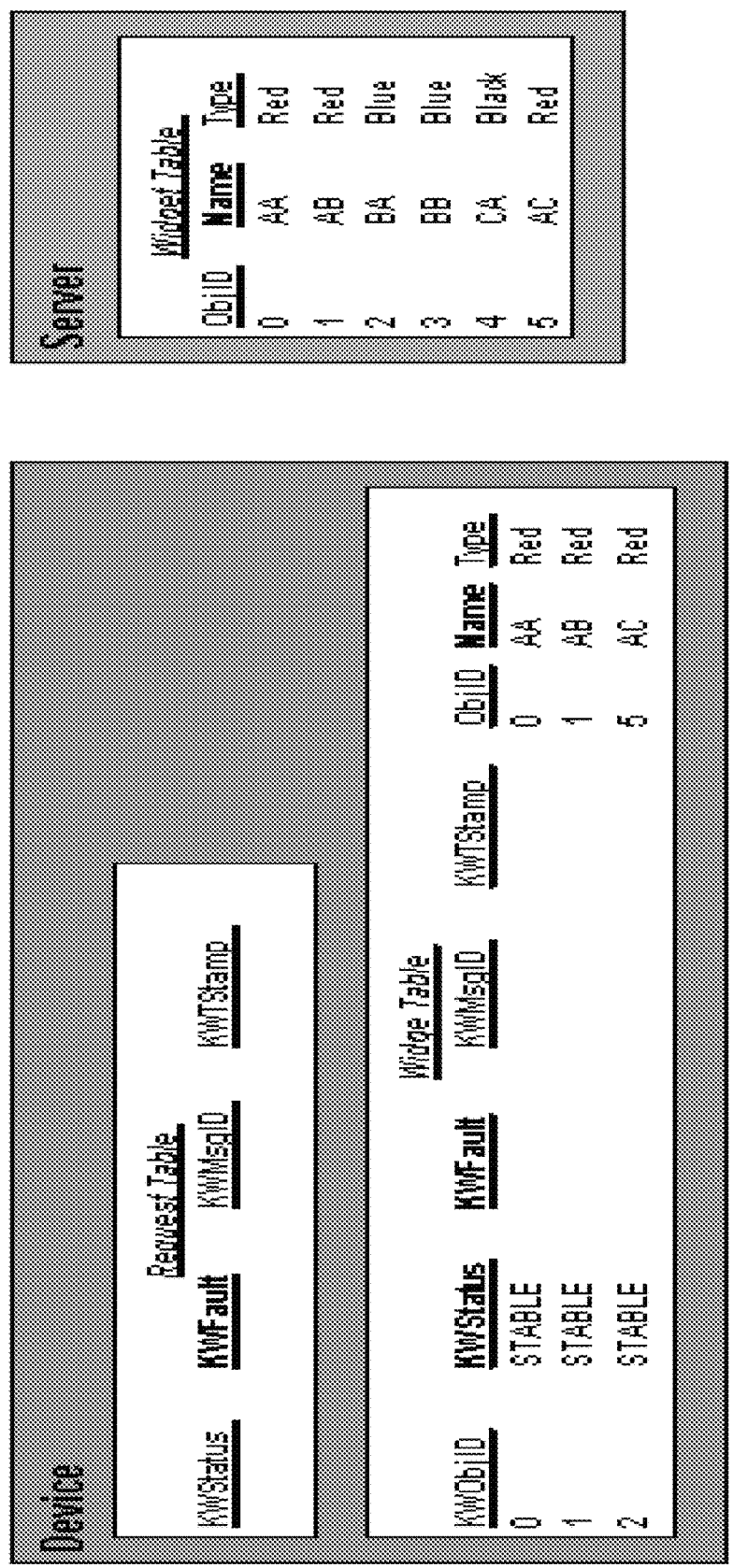
FIG. 21 is a state diagram from an example application involving message and record exchanges.

Device accepts the 'ack' uses the 'kw.mid' and 'kw.obj' to determine which record to update, and the updates that record to be 'STABLE'. State looks like FIG. 21.

Figure 22:
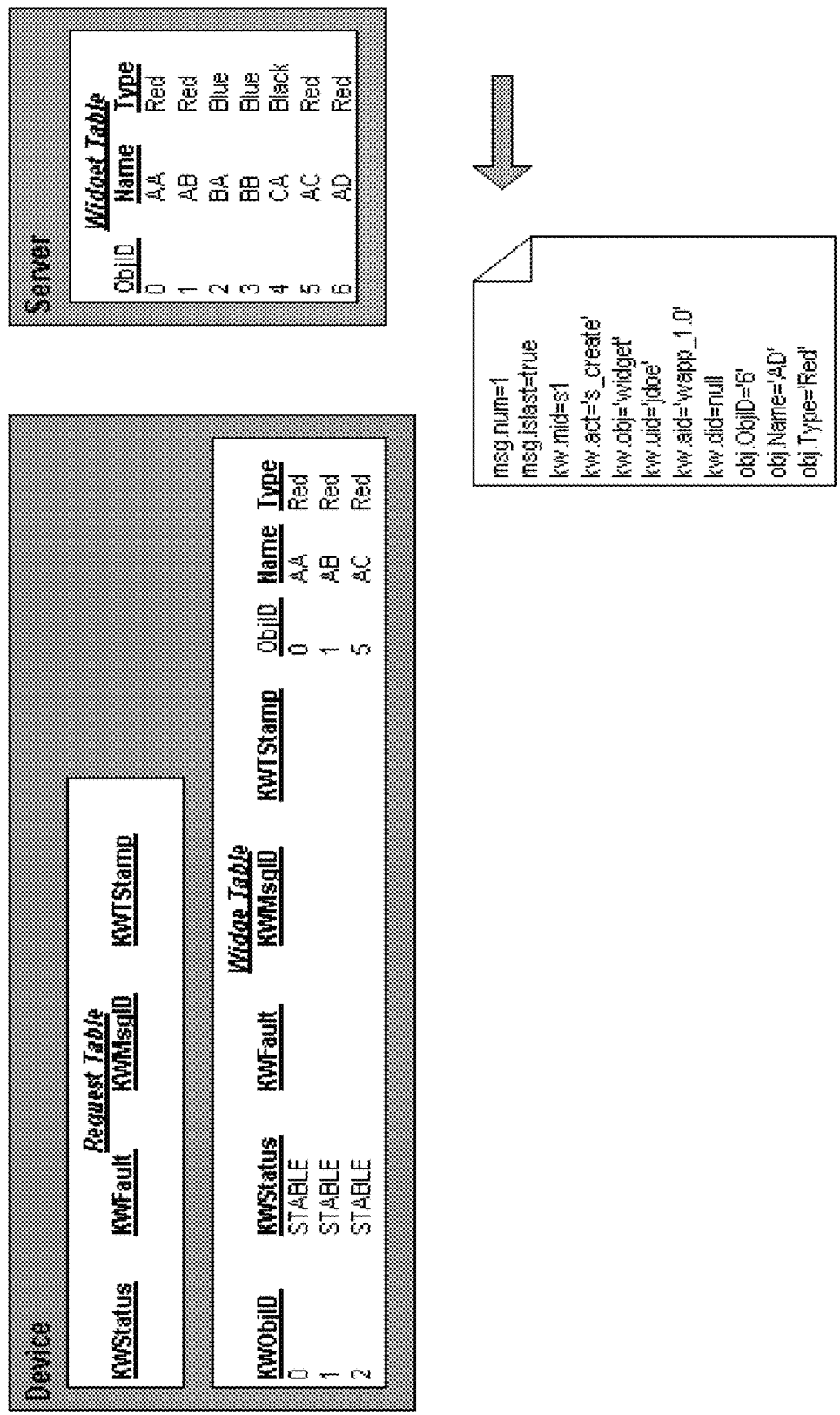
FIG. 22 is a state diagram from an example application involving message and record exchanges.

Now a new Red Widget is created on the server and the server notifies any device that has requested Red Widgets of the new instance. State looks like FIG. 22.

Figure 23:
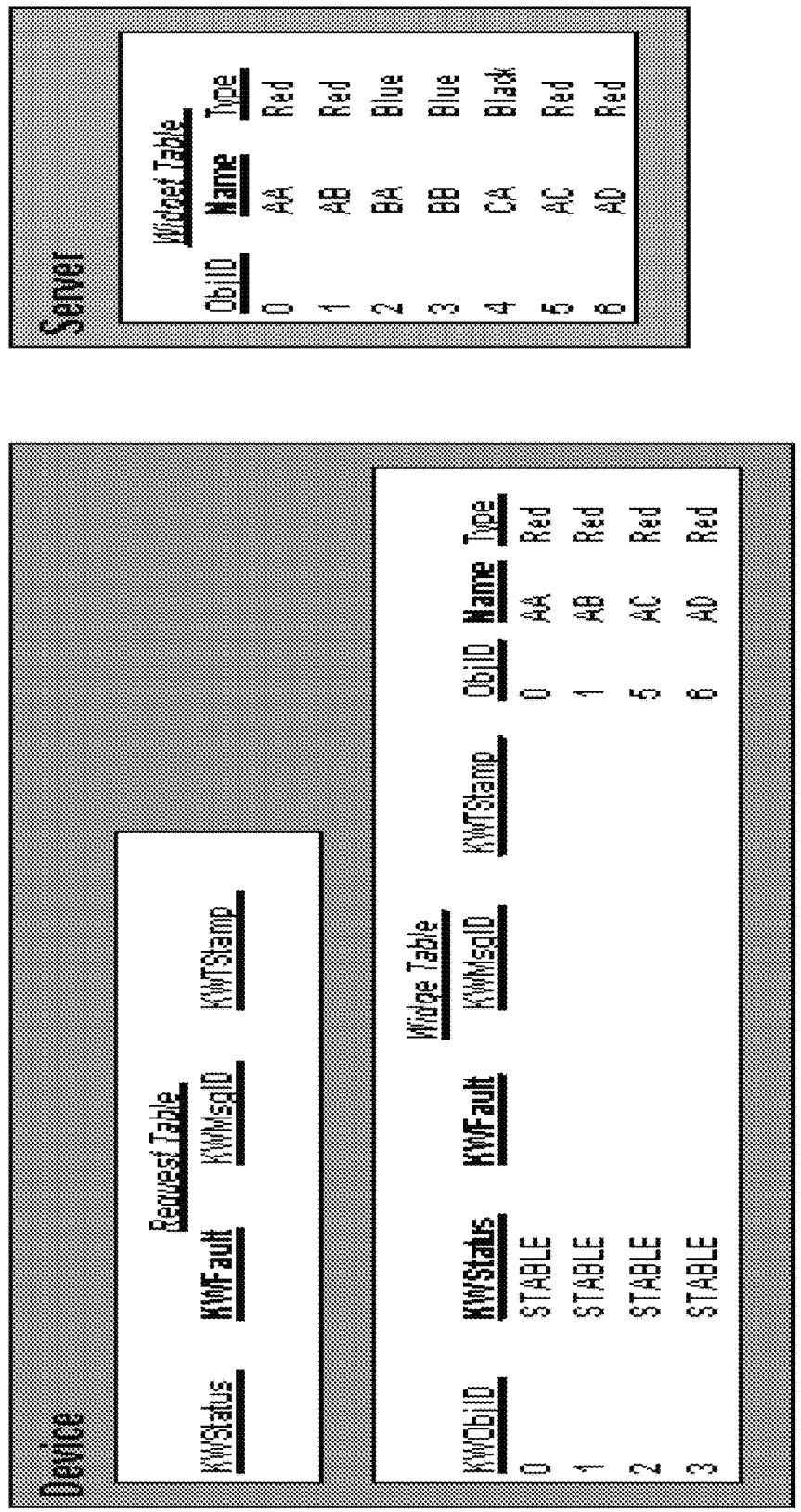
FIG. 23 is a state diagram from an example application involving message and record exchanges.

Finally, the device reads the message, uses the 'kw.act' and 'kw.obj' to determine that a new record needs to be added to the Widget table and updates that table with a new instance. State looks like FIG. 23.

4. Automatic Generation of Untethered Mobile Loosely-Coupled Client-Server Applications Using Asynchronous Messaging and Declarative Models with Guaranteed Transactions This section details how a loosely-coupled client-server application can be developed without any coding by declaring the structures (Graphical User Interface, Business Objects, Mapping) in XML and generating the code for the target platform. It assumes the use of an asynchronous queue to implement guaranteed messaging.

Figure 24:
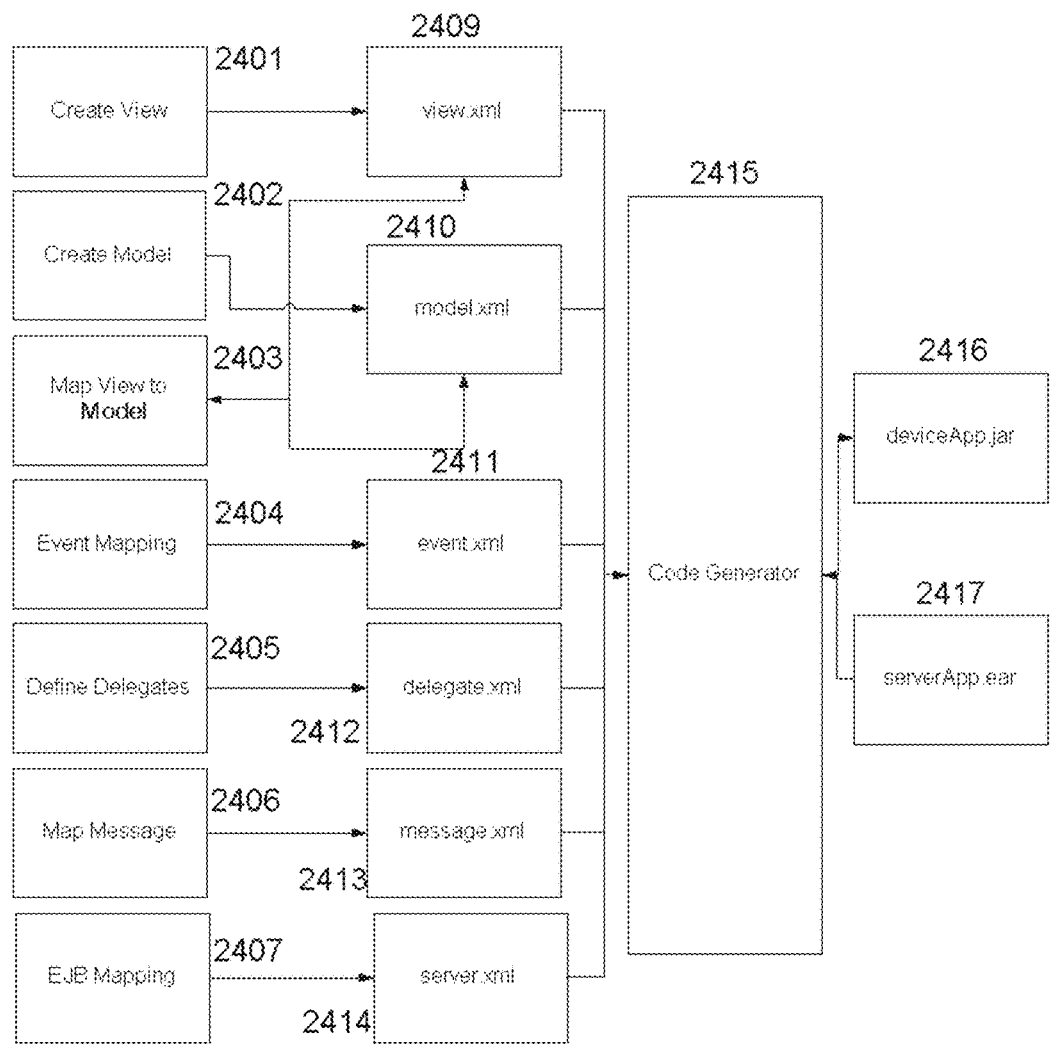
FIG. 24 shows the software modules and files involved in declaratively creating an untethered client-server application without any coding.

FIG. 24 shows at a conceptual level how each aspect of the client-server application is declared (eg. GUI, Model) and related (GUI-Model) to form the intermediate XML structures which are fed into a parser that generates the target client code and server code.

Properties:
Project Name—Name of the application
Main Java Classname—Name of the class that will contain the main( ) method.
Device Family—Device Family associated with the application. Will be used to guide the GUI view, layout and form factors. Will also restrict the list of Device Profiles that can be selected for generation.

Coordination:
Name of application must be unique among the System wide applications.
Current version must be equal or higher than latest version of the application defined in the System.
List of Device Families must come from System defined records.

The View Tab 2401 will be used to describe the entire GUI presentation and layout. Through a series of initial dialogs and interactive editing, the WorkBench user will define an abstract view of the application. This needs to be defined with enough detail to support generating the application for each profile associated with the Device Family selected.

Properties:
Description of all the Cards contained in the application (including the default cards).
For each Card, a description of each of the Panels contained in the Card.
The relationship between Panels. Example is the 'Account Details' panel being related to the 'Account List' panel and being used to show the details of selected records. Thing is, the "Show Details" button can take care of defining the relationship.
For each Panel, a description of each of the GUI components contained in the Panel and where they are positioned within the layout manager. All interactive GUI components will be initially represented as a target. There will only be one type of Target. When the Target is associated with a Model element the Work Bench will resolve it to a simple or complex GUI component.
Any Client Side Delegates attached to the Panel including: Data Manager (Eg. J2ME RMS or PointBase)
Message Center
Timer
Scanner
[. . . ]
Coordination:
Developer can insert cards as needed which will bring up a Card Wizard Modal Dialog to help the developer define a complete card.
Developer can choose from a palette of predefined Cards and Panels.
Layouts have to make sense with respect to the selected Device Family.
GUI Component types must be valid for the selected Device Family. Developer will have to select components from a restricted palette containing components that can be supported within the Device Family.
The schema is shown in Appendix B.
The Model Tab 2402 will be used to describe all the data objects used to store and forward data within the application.

It can be thought of as creating the Beans to support the View. It is not required to match one Model to one View, however, it may be the case that we can simplify the code generation if this is done. Developer will work with a set of palettes representing the basic Java Types, any imported legacy Database schema, and the current Model.

Because the Device Family does not specify the actual version of the JVM this has certain implications on the Data Model used in the WorkBench. There are a couple of options to handle this:

The Data Model only supports the Least Common data types over all the Device Profile platforms. Since the KVM doesn't support Float or Date, then they would not be available as data type in the model tab—even if you were building an Application for the 'Laptop' Device Family.

The Data Model would support the richest set of data types over all the Device Profile platforms. When the Application is actually generated against a Device Profile that does not support some of the data types, then KonaWare conversation data types will be generated to handle the conversion of the rich type to an appropriate native type.

The terms used to describe the Model and it's components will be taken from general entity relationship terms. They are defined as follows:

Model—This is the entity relationship model. It involves identifying the things of importance in an organization (entities), the properties of those things (attributes) and how they are related to one another (relationships). The resulting information model is independent of any data storage or access method.

Entity—an Entity is a thing of significance, either real or conceptual, about which the business or system being modeled needs to hold information. For example, if the business needs to process sales orders, an Entity to represent sales orders would be recorded. An Entity generally corresponds to a physical table or Java Bean, system being modeled needs to hold information. For example, if the business needs to process sales orders, an Entity to represent sales orders would be recorded. An Entity generally corresponds to a physical table or Java Bean.

Attribute—an Attribute is any detail that serves to identify, describe, classify, quantify or provide the state of an entity. For example, the entity, Employee, may have the following attributes: Last Name, First Name, and Hire Date. Attributes are the general equivalent of physical columns in a table.

Datatype—The type and size of the data that will be stored in the attribute.

Primary Keys—While primarily referring to tables, Primary Keys can also pertain to entities. A Primary Key is the mandatory column or columns used to enforce the uniqueness of rows in a table. This is normally the most frequent means by which rows are accessed. Please note, however, that a column which is part of a Primary Key may not contain null values!

Relationship—A named, significant association between two entities. Each end of the relationship shows the degree of how the entities are related and the optionality.

Properties:
All Entities with unique names.
For each Entity, a list of Attributes it contains, which Attributes are Primary Keys.
A list of Relationships to other Entities.
For some Attributes that are restricted to User Defined Choice Lists, need to define the list of choices.

Initial default records for Entities.
Coordination:
Palettes of data structures and types that can be used to build a valid model to include:
  Basic Java Data Types
  Any Legacy Database Schemas that have been exported into the proper palette format.
  The current model objects
Datatypes may need to be restricted to matching Device Families Similar situation as the GUI Components and should be resolved in the same fashion.
The schema in shown in Appendix C.

The View to Model mapping tab 2403 allows the developer to link the Targets on the View to actual attributes contained within the Entities defined.
Properties:
Association between the GUI Card or Panel and the main Entity.
Association between all GUI Targets on the view and an Entity or Attribute element in the Model.
Type of GUI Control, size of the control and display preference to use when displaying the Attribute data. For example, a Long can be displayed as a simple String within a TextArea of width 10 characters or it can be displayed as a Date/Time Widget that can be selected to bring up a special Date/Time entry dialog.
Coordination:
On each Panel, all Attributes associated to its GUI Targets must belong to a related set of Entities. We can extend the system later to allow any attributes, however, right now we want one main Entity associated with a Panel and want to restrict the set of Attributes to those that belong to the Entity or those Attributes contained in Entities directly related to the selected Entity. For example, Account is directly related to Contact but not related to Part. If the developer associates Account to the Panel, only Attributes contained in Account and Contact can be linked Targets on the Panel—no Part Attributes can be used.
All GUI Targets must be assigned.
All assignments must contain enough information so the generator can determine how the Attribute data will be displayed and how the user will interact with the data to enter/update it.
If any updates are made to the Model or View all the mappings need to be validated.

The Event Mapping Tab 2404 associates buttons (actions) with Java code. This basically allows the developer to associate Java code fragments to all events that can happen on the application. This includes button events, GUI display init events and message events from the server.

This is where the developer will explicitly choose if the application is going to use the local data store or send a message to the Bridge. We will not have a thick Delegate abstraction over the Entity Objects that will automatically be able to determine which channel to use Channel decisions are determined dynamically by the administrator when he sets up the policy-based routing rules (see section 1).

The developer needs to determine when a record is stored and when it is sent to the server by writing explicit code in the event handler. We are not going to try to automatically determine when to send a message and when to store a record.

This design provides for a Delegate Interface 2405 for communication with external accessories. There is be a MessageCenter interface (Delegate) that the developer can use to send an Model Entity out as a message and a DataManager interface (Delegate) that will support storing the Model Entity as a local record. This will also be the point where they can integrate other Delegate Interfaces like the timer. Assuming a timer was added to the Panel and is available to the event handler, the button to start the time will simply get the Timer delegate handle and call the start( ) method on it. There will be other methods on the Interface that can be used to stop the timer and get the current elapsed time so it can be used to fill an Entity Attribute.
Properties:
Association of code fragment to each button event
Association of code fragment to each Panel onDisplay event.
Association of code fragment to the main onMessage event for the application.
  Includes all reply's to request messages
  Includes any messages that are pushed to the application. This is the point where the push messages are initially defined. These declarations are then used to generate the initial template for the EJB/Proxy tabs.
NOTE: A model object will have to be declared for any Entities that are going to be pushed to the application. So even if the push record is a simple message that is displayed to the user, the Entity that describes that message will have to be declared—even though it may never be stored on the device.
Coordination:
Make sure all the events are associated with some code.
Make sure all the panels have an init method defined to gather and show data when the Panel is displayed.
Make sure all the possible messages are addressed in the onMessage code.
Validate the code fragments to make sure they are valid Java and use classes that are part of the application CLASSPATH.
Clearly identify and protect auto-generated code from being changed.
Analyze all events that send request to the Message Center to make sure the reply's are available and handled in the onMessage code.
Need to analyze all messages handled in the onMessage code and generate associated methods for the EJB and Proxy templates.
The schema is shown in Appendix D.

The EJB Mapping Tab 2407 Associate all message and sync operations with server-side Java code. Sync operations are out of scope right now. After working on Tab 4, the Event Mapping Tab, all the message traffic to and from the server should be declared and known. This will result in two templates—Inbound and Outbound messages.

The Inbound messages are those requests (or sync operations) that come from the device applications. A method will signature will be created to handle this message within the scope of the JTA XA transaction in the deployed EJB. The developer will have to write the code to take the message contents, call the proper Business Logic, in some cases create the reply message and deliver the reply message.

The Outbound messages are those messages that originate from the server and are pushed out to the device applications. This can be a notification message or an updated record that was changed on the legacy system and needs to be sent to all the device applications that could be affected or care about the change.

Properties:

Association of code fragment to Inbound message.

In those cases where the Inbound request expects a reply, a code fragment must be written to construct the reply and send it back.

Association of code fragment to Outbound message.

Coordination:

Make sure all the possible messages are addressed and signatures are matched.

At some point the Application Server must be defined so the proper set of deployment files can be generated along with the EJB's.

Validate the code fragments to make sure they are valid Java and use classes that are part of the application CLASSPATH.

Clearly identify and protect auto-generated code from being changed.

Have to declare all the possible Queues necessary to support all the message communication.

These will have to be defined on the Message Server and assigned to a Bridge.

The XML files that have been generated will contain all the required structures for generating a client and server application. It is straightforward to match the relationships between the graphical and business objects, and the events and messages to create a process flow that can be generated into programs of any language. The embodiment generates java applications.

Figure 26:
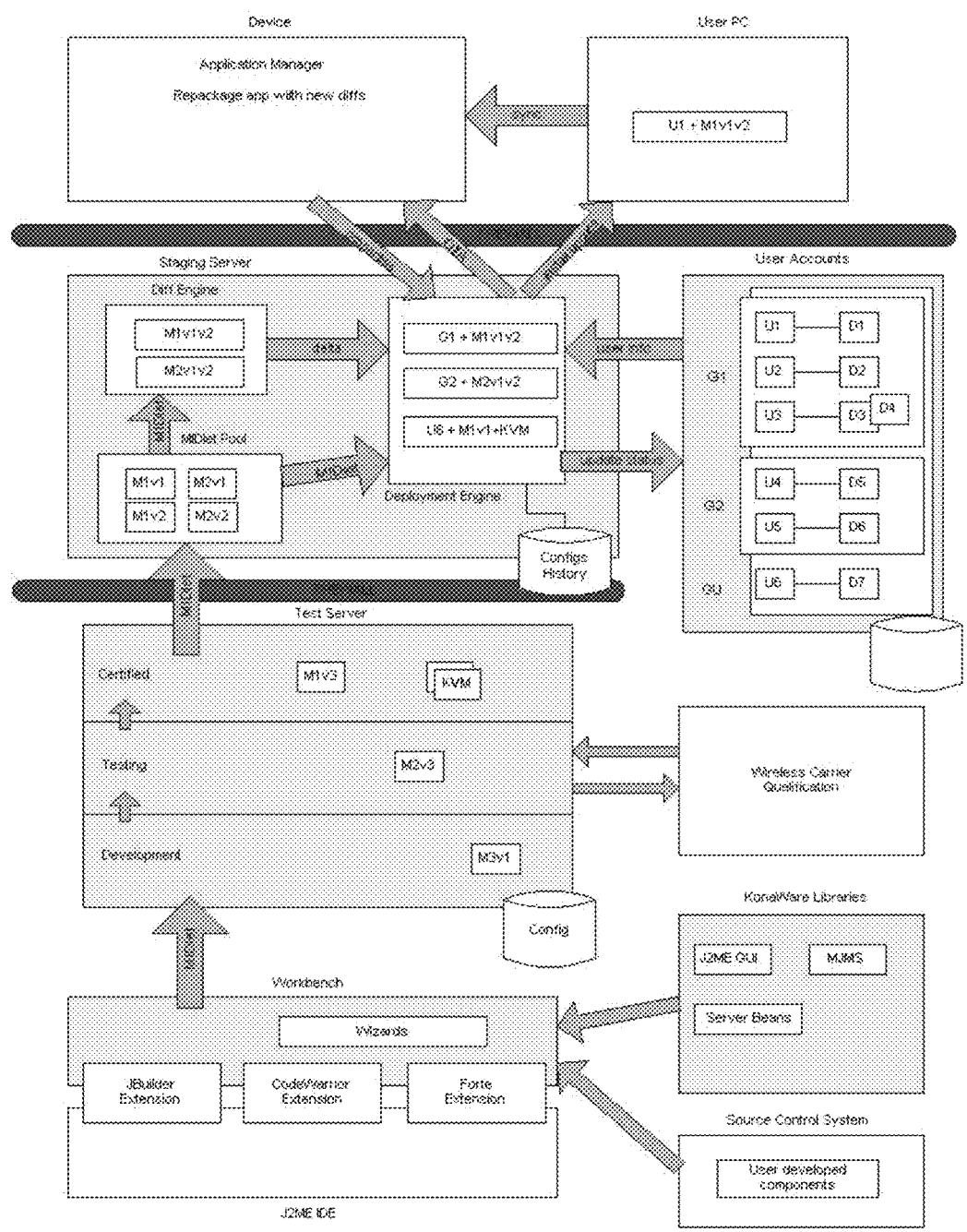
FIG. 26 shows the topology of the deployment system and how packages are provisioned onto devices.

5. Central Administration of Mobile Devices Supporting Phased Deployment and Intermediate Application Parking on Disconnected Workstation FIG. 26 illustrates the KonaWare concepts for deployment of client software, server adapters and data updates.

The Deployment server manages a Test Server and Staging Server (which could be the same physical machine). These servers contain the update Packages.

A Package is generated by the Workbench and consists of:
Code (Java files, .Net files, C/C++ files, etc)
Data (database files, flat files, etc.)
Configuration files (.xml, flat files, property files, etc.)

Each Package has a name and version number assigned by the Administrator. In the figure above, P1v1 is the designation for Package 1, version 1. The Workbench places the packages in the Testing Area of the Test Server. After a Package has been fully tested, it is moved by the Administrator to the Certified Area of the Test Server. The Administrator then moves certified Packages to the Staging Server.

Packages can be updated when the device is directly connected to a Windows PC (Win98 and up) that has LAN access to the Staging Server. Or it can be updated "over the air" using the intermittent (typically wireless network). Using the policy-based routing rules described in section 1, it is possible to specify when these packages should be sent and on which network. For instance, the administrator might not wish to use expensive wireless WAN bandwidth to update files, but rather wait until the user has come into the free corporate WiFi network. On the other hand, an urgent package like a virus patch might be sent on any available channel.

A user must first install the KonaWare Application Manager (KAM), which is a small program (agent) residing on the Device or PC that communicates with the Staging Server. It has two purposes.

1. Tells user of new updates that must be installed (advertisement)

2. Copies packages from Staging Server to appropriate locations on PC so that a user will automatically update his device (Palm, WinCE) when he hits the sync button.

Note: The KonaWare Application Manager must understand how to install packages to the appropriate sync locations for each device platform. Therefore, there is a need for a Palm KAM that creates a channel and delivers updates to the device and a need for an equivalent PocketPC/WinCE KAM.

Additionally, the KAM tells the Staging Server after the user has updated his device so that the Staging Server knows which package has been installed on which device.

Packages are assembled by the Administrator and advertised to users/groups via their KAM. The KAM pops up a dialog on the PC telling the user to install the software and sync his device. If the user has an agent on his device or laptop, then it will receive system messages from the deployment system telling it when to deploy a package.

The user cannot independently access the Staging Server and select files to update. This is a server-side controlled process only in order to limit the costs of managing the devices and software.

The Assembly section of the Staging Server displays the packages that need to be tested. The packages are either placed there by the Workbench or assembled by the Administrator. The list of packages can be sorted by name, creation date or size. The Administrator can accept the name and version number given by the Developer or assign it a new package name and version number. Name and Version numbers are arbitrary alphanumeric strings (spaces accepted) up to 32 characters. Version numbers are not tracked and can be any meaningful string. The only restriction is that the Name and Version number combination must be unique. When a Package is created, it is assigned a gateway URL which points to an existing server application or a new one. The Administrator can assemble a new package that includes other components like a new KVM or database if necessary. To do this, he hits the "New Package" button and selects the components he needs. This new package should then be tested and subsequently moved to the Certified area. The Administrator enters status information in the 128 character alpha-numeric Status field. For example, he can enter "Initial Test", "Waiting for Nextel certification", etc. Changing the Status is done by Editing a Package. This does not change the "Last Modified Date".

Once a Package has been tested, the Administrator moves it to the Certified Area of the Testing Server. The following actions are available:

New Package: Create a new package from existing components in the Assembly area

Edit Package: Edit the package information or content
Information: Name, Version
Content: Add/delete components from the Assembly area Modified Date: Automatically updated by the system Delete Package: Delete the package. No backup is kept. A confirmation modal dialog should appear.

Test with User: Allows administrator to test a package with a user/device. When a package has been tested, some testing history information is written into the Read-Only "Test History" section.

Move to Certified: Moves the package to the Certified Area.

The Certified Package Area of the Testing Server displays the packages that have been moved there by the Administrator after they have been tested. The following actions are available:

Edit Package: Edit the package information only. No code changes allowed.
  Information: Name, Version
  Modified Date: Not updated. The original "Last Modified Date" is retained
Delete Package: Delete the package. No backup is kept. A confirmation modal dialog should appear.
Deploy the Server application. This will deploy the server portion of the package to the appropriate application server. It is a pre-requisite to moving the package to the next step (Staging) because the server must be ready to accept requests when the first device application is deployed.
Move to Staging: Moves the package to the Staging Server.
Move to Assembly/Test: Move the Package back to the Testing Area for further testing or if it is the wrong configuration by clicking on the "Move back to Testing Area" button.

The Staging Server contains the set of packages that have been certified and are ready to be deployed to users. The main purpose is to assign packages to users/groups. After assignments have been made, the administrator advertises the availability of the new update to the KAM's that are installed on user's PC's. Note: The Staging Server can be installed on a separate machine in the DMZ for devices to access the packages, but this is not necessary for v1.0 because Over-the-Air deployment is not supported yet. The Administrator can check on which user has downloaded the advertised package by clicking on the user from the left hand selection panel. One of the columns is called "Updated" which will indicate either "NA", "Downloaded" (ie. downloaded to the PC, but not installed on the device) or the date/time when the user updated the package. Double clicking on the User on the right hand list panel will pop up a dialog with more detailed information, such as the status of the KAM, whether the PC is on or off, errors in the installation, etc. Note that a single PC with a KAM may service multiple users/devices. This is because a field service organization may not assign a PC to each technician, but rather update devices from a few centrally installed PC's.

The following actions are available in the Staging tab:
  Assign to Users: Assigns packages to users/groups. If a user has more than one package assigned (eg. P1 is assigned to User1, but P2 is also assigned to Group1 of which User1 is a part), the later package will overwrite the previous.
  Advertise: Sends a message to the KAM for the specified User/Group that an update is available to be downloaded.
  Delete Package: Delete the package. No backup is kept. A confirmation modal dialog should appear.
  Move to Certified: Move a package back to the Certified Area.

In order for the user to register and download the applications destined for his device, the system must be able to resolve the relationship between the mobile application and device. The resolution of the advertisement to the actual device is a database query involving multiple table joins that will automatically ensure that only the correct devices get the targeted applications intended for it. Other systems require the specification of a platform for a deployment group, so that the package is intended only for homogeneous groups of devices (eg. all are PocketPC, or all are Palm). However, this does not always reflect the reality. The KonaWare method of resolution allows the administrator to define any group of users using any device type. And he can then add any number of packages to that group. The advertisement will automatically determine based on the platform which applications should be deployed to which devices. This makes is much more convenient and intuitive.

Figure 27:
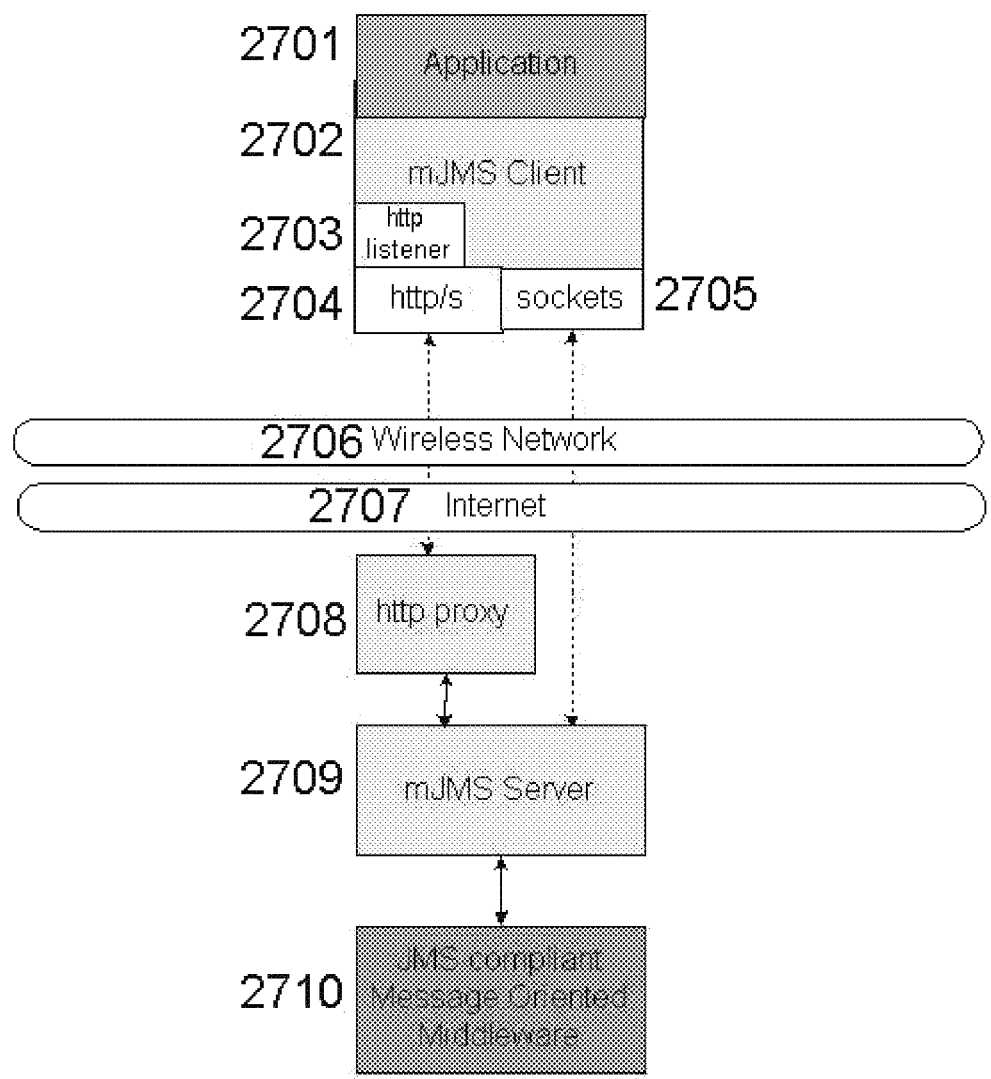
FIG. 27 shows the components of a client-server system and how server-initiated push messaging is employed.

6. Server Initiated Push and Throttling of Messages via Push Proxy to Control Transmissions FIG. 27 shows the components involved in this section.

There are several methods that can be used to push server-initiated messages to a device. If a device is not addressable by the server (no IP address, private IP address), then polling is the only method for simulating a push message from the server to the device.

The KonaWare polling method incorporates several innovations that make the polling more efficient (less polling required) as well as increasing the response time for pushing messages to a device.
  1. Decaying interval algorithm. When a message is sent from the device, the polling algorithm immediately starts with a small interval (eg. 5 seconds) between tries because it is likely that a response from the server will be forthcoming. It decays for each try by increasing the interval (eg. add 5 seconds for every try). The decay algorithm can be exponential or geometric.
  2. Lengthen web server time-out parameters. Another innovation is for each device to send a message to the server requesting updates. If there are no server push messages available in the queue, the web server time-out parameters are changed to be longer than normal (eg. 10 minutes). When a push message is put on the queue, it is immediately sent as the reply to the waiting request. When the time-out has been reached, the device turns around and sends another request message. This method enables virtually instant push messages to devices.
  3. Historical data algorithm. The polling engine can learn from historical server pushes as well. It keeps a list of time windows when the server has most frequently sent messages and ensures that the interval between tries is kept small during these time windows.

Another method for pushing messages to a device is to have an http listener running on the device. The http listener is like a small web server that listens for incoming requests. This method works if the device is addressable (has an IP address that is reachable by an external computer on the Internet) and has sockets. If a device has sockets and is directly addressable from a computer on the Internet, the easiest way to implement server-side push is to have both device and server send messages using sockets.

In several cases, a device has both an IP address and sockets but is still not addressable from an external computer on the Internet because the IP address is kept private by the carrier in order to prevent an uncontrollable number of messages being sent to devices that might cause the wireless infrastructure to fail. In this case, a true-push method (not polling) might be implemented by allowing a set of known trusted servers to access the devices through a Push Proxy. This Proxy must reside inside the wireless carrier's firewall in order to directly address the devices. The carrier provisions the external servers that are allowed to send messages directly to the devices by issuing standard X.509 certificates to them. This will establish a trusted relationship between the servers and the Proxy.

Another method is to use a mechanism provided by the carrier to signal the device to pull an awaiting message. There are several ways to accomplish this. One method is to use Short Message Service (SMS) available on the GSM/GPRS wireless service. Some operating systems allow a client application to intercept an SMS message so we can have an agent that is constantly looking for an SMS message with a specific code that it understands and will cause the Shuttle to wake up and pull a message. Another method is to use signaling in the wireless modem. By this, we mean that the server could dial the wireless model and wake up the device to pull messages from the server. This method is dependent on the hardware installed.

Should a trusted server send too many messages that might endanger the wireless network, the Proxy can do several things:

1. Throttle the message traffic transmission rate
2. Revoke the certificate such that no further messages can be received.

The Message Throttle is a mechanism whereby a carrier can control the rate that messages are transmitted over its wireless infrastructure. In the case, where there is a large number of messages being sent at the same time, it might be important to ensure that not too many get sent and cause the network to melt down.

By installing Push Proxies in the wireless network, any messages from external servers are automatically kept in a queue and sent according to the available throughput of the network channel. If it is too busy, the messages are kept in the queue. In addition, messages can be prioritized so that urgent messages are sent first when bandwidth is available.

The invention claimed is:

1. A system comprising:
a processor; and
computer readable code to:
generate data blocks on a mobile device for transmission to a remote processor;
apply a policy containing one or more rules to determine whether to send the data blocks via first or second wireless network, wherein each wireless network provides intermittent access and each wireless network has different communication costs, and wherein each rule comprises a function of cost, availability, one or more messaging attributes of data, and channels; and
transmit the data blocks over the first wireless network if the first wireless network is available and otherwise transmit the data blocks using the second wireless network according to the policy;
relinquish a network connection before receiving a confirmation of transmission success or failure; and
subsequently notify the mobile device that the transmission of the data blocks was successful or unsuccessful, and if unsuccessful, retransmit the data blocks over the first or second wireless network.

2. A method for optimizing communication cost, the method comprising:
generating data blocks on a mobile device for transmission to a remote processor;
applying a policy containing one or more rules to determine whether to send the data blocks via first or second wireless network, wherein each wireless network provides intermittent access and each wireless network has different communication costs, and wherein each rule comprises a function of cost, availability, one or more messaging attributes of data, and channels; and
transmitting the data blocks over the first wireless network if the first wireless network is available and otherwise transmitting the data blocks using the second wireless network according to the policy;
relinquishing a network connection before receiving a confirmation of transmission success or failure; and
subsequently notifying the mobile device that the transmission of the data blocks was successful or unsuccessful, and if unsuccessful, retransmitting the data blocks over the first or second wireless network.

3. The method of claim 2, comprising automatically detecting networks by observing changes in a TCP/IP route table and configured by altering the default route.

4. The method of claim 2, comprising running loosely coupled client-server applications without coding by declarative programming using relating business objects and graphical objects and mapping the objects into messages using properties sheets.

5. The method of claim 2, comprising handing data from an originating application to a gateway which immediately releases the connection so that the application does not have to wait for an acknowledgement from a target application.

6. The method of claim 2, wherein the first wireless network comprises cellular wireless network and the second wireless network comprises a wireless local area network (WLAN), comprising queuing data for retransmission upon a transmission failure and subsequently transmitting using an available network or WLAN based on the rule as a function of one of: cost, availability, one or more messaging attributes of data, channels and system environment.

7. The method of claim 2, comprising establishing a new connection to send the data block to the application when a reply is generated from the target application.

8. The method of claim 2, wherein the gateway sends the data block to the application and any errors, rollbacks or replies are sent to the originating application with a new connection.

9. The method of claim 2, comprising code to provide bi-directional transactions between wireless/mobile devices and enterprise server applications, wherein transactions are achieved between client and server by breaking up transmission sequence such that the client does not have to wait until the transaction is completed before relinquishing the network connection, further comprising using asynchronous messaging where a message is persisted at every step and handed to the next stage without waiting, wherein a reply from the server comes back to a client as an asynchronous message and completes the transaction.

10. The method of claim 2, comprising code to break up a sequence such that the client does not have to wait until a transaction is completed before relinquishing the network connection.

11. The method of claim 2, comprising code to perform asynchronous messaging, where a data block is persisted at every step and handed off to a next stage without waiting.

12. The method of claim 2, comprising code to process a reply from the server as an asynchronous message and complete the transaction.

13. The method of claim 2, comprising code to perform bi-directional communication using server-initiated push.

14. The method of claim 2, wherein data blocks are sent via intermittent communication channels with periodic outage by using a combination of a physical network and a service provider, comprising ensuring reception of data by retransmitting data based on the rule when one of the networks becomes available.

15. The method of claim 2, wherein networks are automatically detected by observing changes in the TCP/IP route table and configured by altering the default route, comprising ensuring reception of data by retransmitting data based on the rule when one of the network becomes available.

16. The method of claim 2, wherein service providers are determined by using identification servers accessible only in specific networks.

17. The method of claim 2, wherein transmission rules are formed using regular expressions to combine system, message and channel parameters.

18. A system comprising
a server;
a plurality of wireless networks coupled to the server; and
one or more mobile devices intermittently coupled to first and second wireless networks providing data communication between client and server applications over multiple intermittent connections, wherein the connections are selected based on a least cost, availability, messaging attributes, and channel availability, wherein a first wireless network cost to communicate data is greater than a second wireless network cost; wherein the devices apply a policy containing one or more rules to determine whether to transmit via the first or second wireless network the data to the mobile devices, each rule being a function of cost, availability, one or more messaging attributes, and channels; and the mobile devices communicating data over the second wireless network data if the second wireless network is available and otherwise transmitting the data using the first wireless network according to the policy, wherein the mobile devices relinquish network connections before receiving a confirmation of success or failure of a transmission, and subsequently notifying the mobile device of the confirmation, where in case of failure, the mobile device performs a retransmission of the data over the first or second wireless network.

19. The system of claim 18, comprising computer readable code for:
creating a first transaction on a first device, the first transaction including one or more data blocks intended to be exchanged with a second device over first or second wireless networks;
creating a first device queue on the first device, the first device queue reflecting a current status of the first transaction, including which data block of the first transaction have been successfully or unsuccessfully sent or received;
creating a second device queue on the second device, the second device queue reflecting a current status of the first transaction, including which data block of the first transaction have been successfully or unsuccessfully sent or received;
applying a policy containing one or more rules to determine whether to send via the first or second wireless network data to the mobile device, each rule being a function of cost, availability, one or more messaging attributes of messages, channels or system environment; and
sending the data blocks over the second wireless network data if the second wireless network is available and otherwise sending the data block using the first wireless network according to the policy and notifying the first device that the first transaction sent by the first device was successfully or unsuccessfully received by the second device, wherein the transaction is achieved by breaking up a transmission such that the first or second device does not wait until the transaction is completed before relinquishing a network connection.

20. The system of claim 18, comprising code to determine a cost for each channel and priority thresholds based on the cost envelope and code to balance the cost and service by using min-max optimization of items including: cost structures of each channel, target total cost of each channel, expected volume of messages, priority of to be sent by an expensive Channel, priority of messages to be sent by an inexpensive channel , and wherein messages are sent by a factor selected from the group consisting of: specific time or event, billing cycle, billing unit, tier, time, availability, urgency, retry frequency, ping priority, ping frequency, and aging.

* * * * *